US005880741A

United States Patent [19]

Takeuchi

[11] Patent Number: 5,880,741

[45] **Date of Patent: *Mar. 9, 1999**

[54] METHOD AND APPARATUS FOR TRANSFERRING VIDEO DATA USING MASK DATA

[75] Inventor: Kesatoshi Takeuchi, Suwa, Japan

[73] Assignee: Seiko Epson Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 960,270

[22] Filed: Oct. 29, 1997

Related U.S. Application Data

[63] Continuation of Ser. No. 426,564, Apr. 21, 1995, abandoned.

[30] Foreign Application Priority Data

May 13, 1994 [JP] Japan .................................... 6-124352

[51] Int. Cl.[6] ..................................................... G06T 11/00

[52] U.S. Cl. ............................................................. 345/435

[58] Field of Search ...................................... 345/433–439

[56] References Cited

U.S. PATENT DOCUMENTS 5,500,933 3/1996 Schnorf .................................. 395/134

5,553,210 9/1996 Narayanaswami ...................... 395/134

FOREIGN PATENT DOCUMENTS 4-156496 5/1992 Japan .

4-214598 8/1992 Japan .

*Primary Examiner*—Almis R. Jankus

*Attorney, Agent, or Firm*—Oblon, Spivak, McClelland, Maier & Neustadt, P.C.

[57] ABSTRACT

A mask data RAM (Random Access Memory) 213 stores mask data TDATA, which is 1 bit dot data representing a moving picture area MR. The state of the mask data TDATA determines the level of a write signal /MWR given to a dual-port VRAM (Video Random Access Memory) 212 for storing video data. An address for DMA (Direct Memory Access) transfer of the video data to the dual-port VRAM 212 is given to the mask data RAM 213 as well as the dual-port VRAM 212, and therefore the mask data TDATA are read out from the mask data RAM 213 for each dot of the video data. The mask data TDATA are updated according to the position and the shape of a moving picture window on a display screen. This allows a moving picture of an arbitrary shape corresponding to the state of the moving picture window to be transferred to the dual-port VRAM 212 and displayed on the display device.

12 Claims, 28 Drawing Sheets

WRITING OF MASK DATA INTO MASK DATA RAM 213
Fig. 5 (a) VCS
Fig. 5 (b) TCS
Fig. 5 (c) TCSS
Fig. 5 (d) TWR
Fig. 5 (e) TOE
Fig. 5 (f) TADD
Fig. 5 (g) TDATA
MAINADD
MAINDATA
DATA UPDATE PERIOD
MOVING PICTURE PERIOD (DMA TRANSFER)
STILL PICTURE PERIOD (ACCELERATOR ACTIVE)
MOVING PICTURE PERIOD (DMA TRANSFER)

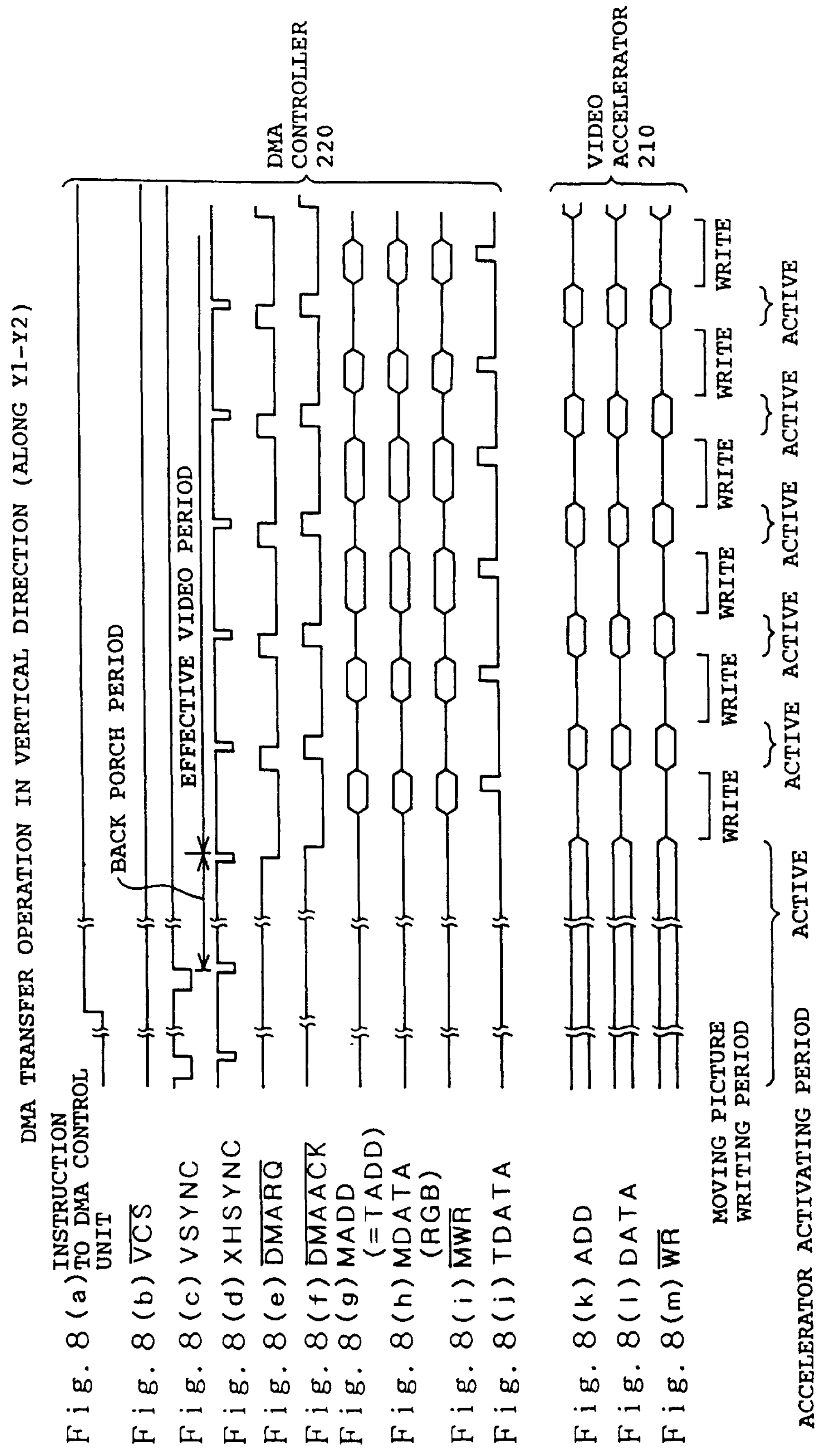
DMA TRANSFER OPERATION IN VERTICAL DIRECTION (ALONG Y1-Y2)
Fig. 8(a) INSTRUCTION TO DMA CONTROL UNIT
Fig. 8(b) $\overline{VCS}$
Fig. 8(c) VSYNC
Fig. 8(d) XHSYNC
Fig. 8(e) $\overline{DMARQ}$
Fig. 8(f) $\overline{DMAACK}$
Fig. 8(g) MADD (=TADD)
Fig. 8(h) MDATA (RGB)
Fig. 8(i) $\overline{MWR}$
Fig. 8(j) TDATA
Fig. 8(k) ADD
Fig. 8(l) DATA
Fig. 8(m) $\overline{WR}$
BACK PORCH PERIOD
EFFECTIVE VIDEO PERIOD
DMA CONTROLLER 220
VIDEO ACCELERATOR 210
WRITE
WRITE
WRITE
WRITE
WRITE
WRITE
MOVING PICTURE WRITING PERIOD
ACTIVE
ACTIVE
ACTIVE
ACTIVE
ACTIVE
ACTIVE
ACCELERATOR ACTIVATING PERIOD

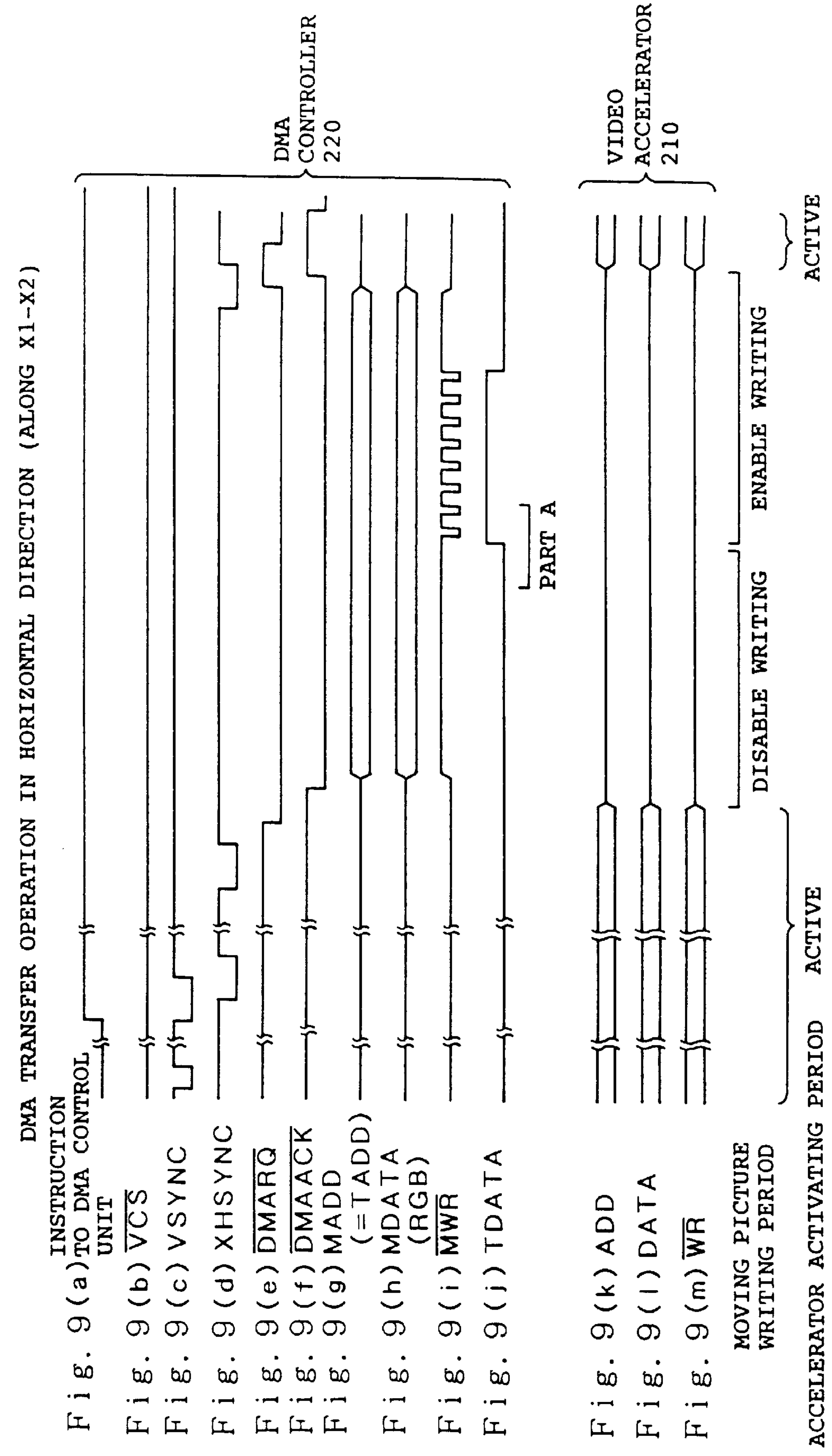
DMA TRANSFER OPERATION IN HORIZONTAL DIRECTION (ALONG X1-X2)
Fig. 9(a) INSTRUCTION TO DMA CONTROL UNIT
Fig. 9(b) VCS
Fig. 9(c) VSYNC
Fig. 9(d) XHSYNC
Fig. 9(e) DMARQ
Fig. 9(f) DMAACK
Fig. 9(g) MADD (=TADD)
Fig. 9(h) MDATA (RGB)
Fig. 9(i) MWR
Fig. 9(j) TDATA
Fig. 9(k) ADD
Fig. 9(l) DATA
Fig. 9(m) WR
DMA CONTROLLER 220
VIDEO ACCELERATOR 210
PART A
MOVING PICTURE WRITING PERIOD
DISABLE WRITING
ENABLE WRITING
ACCELERATOR ACTIVATING PERIOD
ACTIVE
ACTIVE DETAILS OF PART A IN FIGS. 9(G)-9(J)
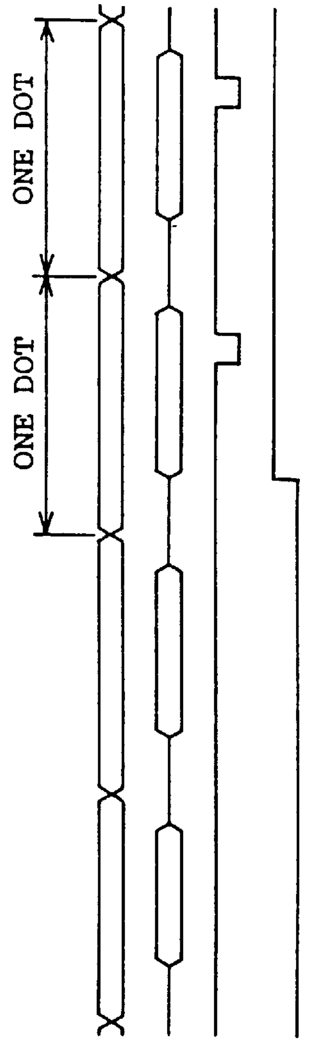
Fig. 10(a) MADD (=TADD)
Fig. 10(b) MDATA (RGB)
Fig. 10(c) $\overline{MWR}$
Fig. 10(d) TDATA Fig. 18(a) VERTICAL SYNC SIGNAL Fig. 18(b) HORIZONTAL SYNC SIGNAL Fig. 18(c) VERTICAL COUNT Fig. 18(d) HORIZONTAL COUNT Fig. 18(e) WORD SYNC SIGNAL Fig. 18(f) DMA REQUEST SIGNAL Fig. 18(g) DMA ACK SIGNAL Fig. 20(C) ONE FRAME $$f_{CLKO} = HX * f_{CLKI} = 3 * f_{CLKI}$$

TOTAL VERTICAL MAGNIFICATION Mv=Nv/Nvo

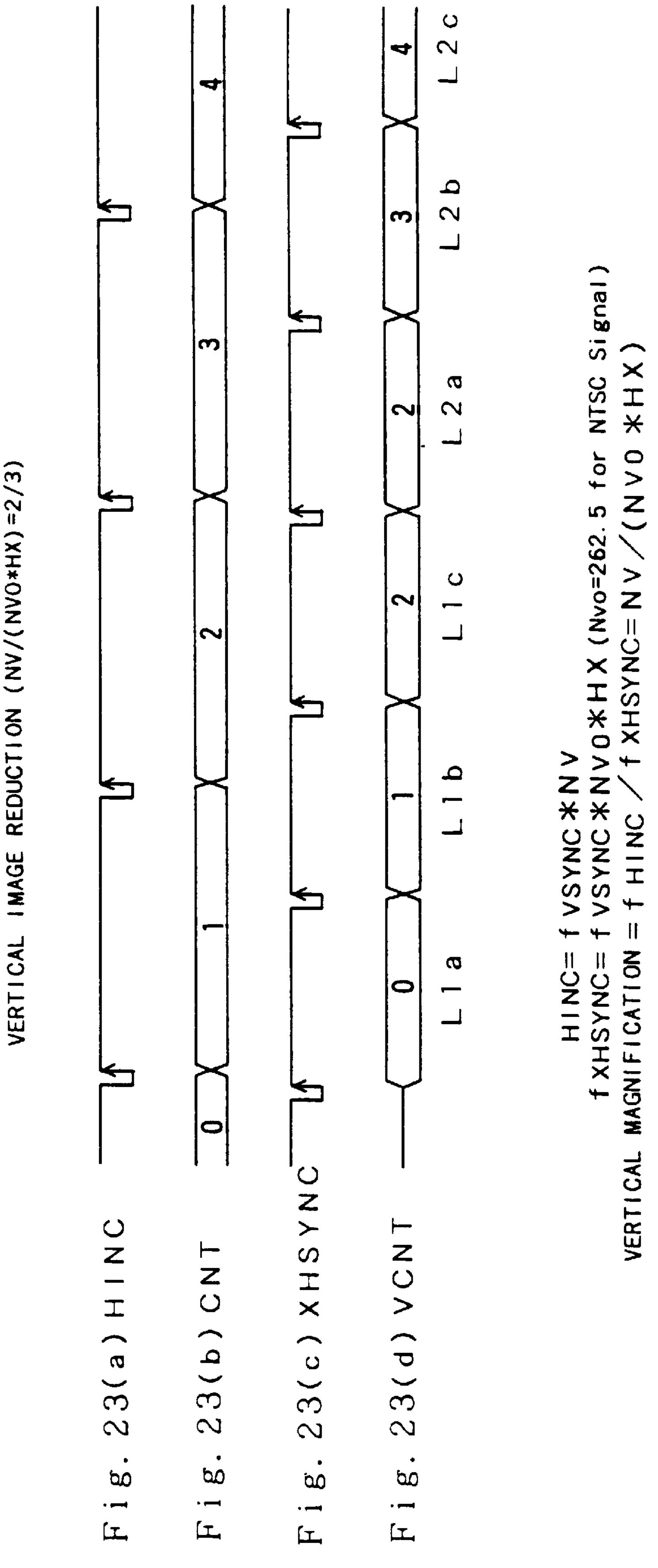
VERTICAL IMAGE REDUCTION (NV/(NVO*HX)=2/3)
Fig. 23(a) HINC
Fig. 23(b) CNT
Fig. 23(c) XHSYNC
Fig. 23(d) VCNT
0
1
2
3
4
L1a
L1b
L1c
L2a
L2b
L2c
HINC= f VSYNC*NV
f XHSYNC= f VSYNC*NVO*HX (Nvo=262.5 for NTSC Signal)
VERTICAL MAGNIFICATION = f HINC / f XHSYNC= NV/(NVO*HX)

Fig. 24(A) VIDEO IMAGE BY VIDEO SIGNAL
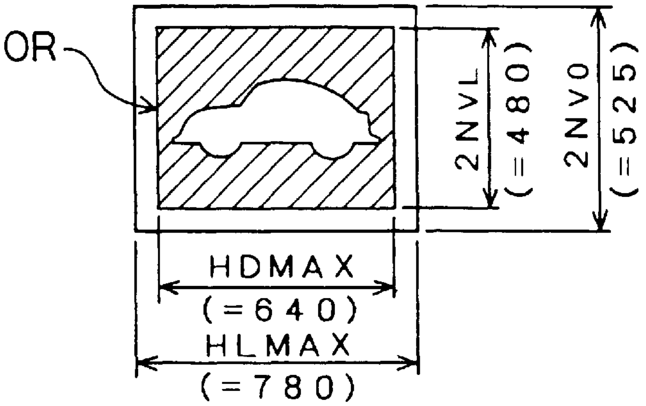
Fig. 24(B) VRAM SPACE
MV: VERTICAL MAGNIFICATION
MH: HORIZONTAL MAGNIFICATION
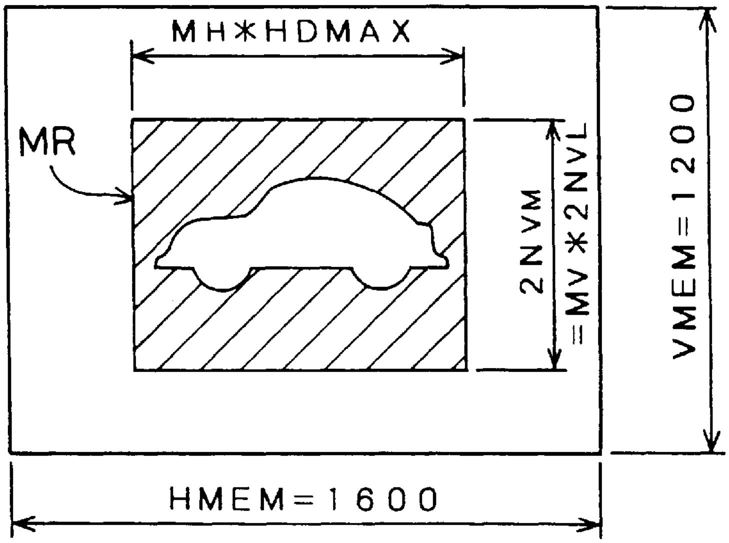
SET VALUE NH OF PLL CIRCUIT 327 $= NH0 * MH * HX$
SET VALUE NV OF PLL CIRCUIT 328 $= \frac{Mv * NVL}{NVL} * NV0 = MV * NV0$
$NH0 = \frac{f\ CLKI}{f\ HSYNC}$, $Nv0 = \frac{f\ HSYNC}{f\ VSYNC}$

METHOD AND APPARATUS FOR TRANSFERRING VIDEO DATA USING MASK DATA

Continuation of application Ser. No., 08/426,564, filed on Apr. 21, 1995, now abandoned.

BACKGROUND OF THE INVENTION

1. Field of the Invention

The present invention relates to a method and an apparatus for transferring video data to a frame memory, and also to a computer system having the video data transfer apparatus.

2. Description of the Related Art

The so-called DMA (Direct Memory Access) transfer can be used in transferring video data supplied from an external device to a video memory in a personal computer.

FIG. 29 is a block diagram showing a conventional computer system having a DMA controller for transferring video data to a video RAM. Three video memories 51R, 51G, and 51B store color data Dr, Dg, and Db for red (R), green (G), and blue (B), respectively. These color data Dr, Dg, and Db are previously binarized, for example, by the Dither Method. DMA controller 55 obtains the right of use of an address bus 53, a data bus 52, and a control bus 54 from a CPU 59, and executes real-time transfer of the binary color data Dr, Dg, and Db stored in the three video memories 51R, 51G, and 51B to video RAMs 56R, 56G, and 56B for display. The binary color data Dr, Dg, and Db thus transferred are further sent to a monitor control unit 57 from the VRAMs 56R, 56G, and 56B to display a video image on a monitor 58.

In DMA transfer, the CPU 59 sends a display start address for the VRAM 56R for the R component to the DMA controller 55 to activate the DMA controller 55. The DMA controller 55 obtains the right of use of the buses from the CPU 59; transfers the binary color data Dr of the R component on a first line to the VRAM 56R; and returns the right of use of the buses to the CPU 59. The CPU 59 then sends a display start address for the VRAM 56G for the G component to the DMA controller 55 to activate the DMA controller 55, which transfers binary color data Dg in the same manner as for the R component. The B component is also transferred in the same manner. In transferring video data on a second line, the CPU 59 calculates and sends respective display start addresses on the second line for the VRAMs 56R, 56G, and 56B to the DMA controller 55 for successively transferring the binary color data Dr, Dg, and Db of the color components R, G, and B, respectively.

The CPU 59 calculates respective display start addresses on each line for the VRAMs 56R, 56G, and 56B and sends the addresses to the DMA controller 55 in the above manner, and the DMA controller 55 executes DMA transfer of the color data Dr, Dg, and Db on each line accordingly, whereby one field of color data is transferred to the VRAM 56. 'One field' corresponds to an image covered by one-through scanning from the left upper corner to the right lower corner on the screen. In many cases, the two-to-one interlace scanning is performed where two fields compose an image of one frame (or one screen). In this case, the binary color data is transferred by the DMA transfer at a rate of approximately 60 fields per second to display a moving picture on the monitor 58.

One scanning period of one horizontal line is equal to 63 microseconds for NTSC (National Television System Committee) video signals. In the conventional system shown in FIG. 29, only several fields of data can be transferred each second because the CPU 59 consumes much time in calculating and sending the display start addresses to the DMA controller 55, and so does the DMA controller 55 in obtaining the right of use of the buses from the CPU 59 and in the DMA transfer of the binary color data Dr, Dg, and Db on each line. Especially the CPU 59 requires a relatively long time for calculation of the display start addresses and for output of the addresses to the DMA controller 55. As described above, the conventional system transfers only several fields of data per second, and cannot display a smooth moving picture accordingly.

Recent advancement in faster CPUs and memories of larger capacities leads to the rapid spread of personal computers under a multi-window operation system. Some computer systems can display a moving picture in a window.

FIGS. 30(A) and 30(B) shows still picture images SIa and SIb and a moving picture image MI simultaneously displayed in a multi-window system. The conventional system can execute DMA-transfer to transfer a moving picture only when a display area of the moving picture image MI is rectangular in shape as shown in FIG. 30(A), but can not transfer video data representing a moving picture in a non-rectangular display area. The 'display area' denotes an area where a video image is displayed on the screen of a display device. When the area of the still picture image SIa in FIG. 30(A) becomes active and is superposed upon the moving picture image MI as shown in FIG. 30(B), for example, the conventional computer systems can not execute DMA-transfer to transfer the moving picture image MI having the non-rectangular display area.

SUMMARY OF THE INVENTION

An object of the present invention is to attain high-speed transfer of video data representing a moving picture having an arbitrary shape.

The present invention is directed to an apparatus, for use in a computer system having a display device, for transferring video data. The apparatus comprises: a frame memory for storing video data representing a video image to be displayed on the display device; video data supplying means for supplying moving-picture video data representing a moving picture; a mask data memory for storing mask data representing a moving picture area in the frame memory into which the moving-picture video data are to be written. The mask data memory has the same address space as the frame memory. The apparatus further comprises data transfer means for supplying a common address to the frame memory and the mask data memory, thereby reading out the mask data from the mask data memory and writing the moving-picture video data supplied from the video data supplying means into the moving picture area of the frame memory as a function of the mask data.

Since the moving-picture video data is written into the frame memory as a function of the mask data representing a moving picture area, a moving-picture video data within the moving picture area, which can be in an arbitrary shape, will be written into the frame memory.

In a preferred embodiment of the present invention, the data transfer means comprises: adjusting means for adjusting a write signal for permitting a writing operation of the frame memory as a function of the mask data.

Preferably, the mask data includes one bit data assigned to each pixel of an image to be displayed on the display device; and the adjusting means further comprises: means for adjusting the write signal with respect to the each pixel by logical operation between the mask data and the write signal.

The apparatus further comprises: mask data updating means for updating the mask data, responsive to a change of a moving-picture display area of the moving picture on the display device, to make the moving picture area coincide with the moving-picture display area.

The data transfer means comprises address generation means for generating the common address. The address generation means comprises: a first memory for storing an offset address indicating a start position of the moving picture area in the frame memory; a second memory for storing an adding address indicating a number of bytes corresponding to a predetermined number of scanning lines in the frame memory, the predetermined number being at least one; first operation means for calculating a vertical address as a function of vertical and horizontal synchronizing signals synchronous with the moving-picture video data, the vertical address being equal to a value of the adding address multiplied by a scanning line number indicating an ordinal number of a scanning line in the moving picture, the scanning line number being specified by a number of pulses of the horizontal synchronizing signal given to the first operation means; a horizontal counter for generating a horizontal address indicating a difference of an address between an initial position of each scanning line in the moving picture and each pixel on the each scanning line; second operation means for adding the vertical address, the horizontal address, and the offset address to obtain a transfer address indicating an address in the first video memory corresponding to a position of the each pixel on the each scanning line in the video image, and outputting the transfer address onto the local bus; and data output means for outputting onto the local bus the video data to be transferred to the first video memory according to the transfer address.

The data transfer means further comprises: a plurality of video data buffers, each video data buffer storing a predetermined amount of the moving-picture video data; and buffer control means for selecting at least one video data buffer for writing in the moving-picture video data and at least another video data buffer for reading out the moving-picture video data, among the plurality of video data buffers in a predetermined order and activating the selected video data buffers.

The buffer control means comprises: line increment signal generation means for generating a line increment signal whose frequency is Nv times a frequency of the vertical synchronizing signal, based on at least one of the vertical synchronizing signal and the horizontal synchronizing signal; and the first operation means comprises means for adding a number of pulses of the line increment signal generated during latest two pulses of the horizontal synchronizing signal to the scanning line number, in response to each pulse of the horizontal synchronizing signal; and whereby the moving picture represented by the moving-picture video data transferred to the frame memory can be reduced in a vertical direction by adjusting a value of Nv used in the line increment signal generation means.

The buffer control means comprises: input clock generation means for generating an input clock signal whose frequency is NHO times a frequency of the horizontal synchronizing signal, and supplying the input clock signal as a write-in synchronizing signal to the one video data buffer selected for writing in the moving-picture video data; and output clock generation means for generating an output clock signal whose frequency is HX times the frequency of the input clock signal, where HX is an integer, and supplying the output clock signal as a read-out synchronizing signal to the another video data buffer selected for reading out the moving-picture video data; and whereby the moving picture represented by the moving-picture video data read out of the plurality of video data buffers being expanded in the vertical direction by adjusting a value of HX used in the output clock generation means.

The buffer control means comprises: dot clock generation means for generating a dot clock signal whose frequency is NH times a frequency of the horizontal synchronizing signal, the dot clock signal being used as a synchronizing signal in writing into the frame memory the moving-picture video data which is read out of the plurality of video data buffers; and whereby the moving picture represented by the moving-picture video data transferred to the frame memory can be reduced and expanded in a horizontal direction by adjusting a value of NH used in the dot clock generation means.

The present invention is further directed to an apparatus for transferring moving-picture video data representing a moving picture, for use in a computer system including a display device, a frame memory for storing video data representing a video image to be displayed on the display device, and a mask data memory for storing mask data representing a moving picture area in the frame memory into which the moving-picture video data are to be written. The mask data memory has the same address space as the frame memory. The apparatus comprises: video data supplying means for supplying the moving-picture video data; and data transfer means for supplying a common address to the frame memory and the mask data memory, thereby reading out the mask data from the mask data memory and writing the moving-picture video data supplied from the video data supplying means into the moving picture area of the frame memory as a function of the mask data.

According to another aspect of the present invention, a computer system comprises: a display device for displaying an image; a frame memory for storing video data representing the image to be displayed on the display device; video data supplying means for supplying moving-picture video data representing a moving picture; a mask data memory for storing mask data representing a moving picture area in the frame memory into which the moving-picture video data are to be written, the mask data memory having the same address space as the frame memory; and data transfer means for supplying a common address to the frame memory and the mask data memory, thereby reading out the mask data from the mask data memory and writing the moving-picture video data supplied from the video data supplying means into the moving picture area of the frame memory as a function of the mask data.

According to still another aspect of the present invention, a method of transferring moving-picture video data representing a moving picture to a frame memory, comprises the steps of: providing the moving-picture video data; providing mask data representing a moving picture area in the frame memory into which the moving-picture video data are to be written; and writing the moving-picture video data into the moving picture area of the frame memory as a function of the mask data.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 8(*a*) through 8(*m*) are timing charts showing DMA transfer operation in the vertical direction;

FIGS. 9(*a*) through 9(*m*) are timing charts showing DMA transfer operation in the horizontal direction;

FIGS. 10(*a*) through 10(*d*) are timing charts showing details of part A in the timing charts of FIGS. 9(*g*) through 9(*j*), respectively;

FIGS. 20(A) through 20(C) show memory spaces for an odd line field and an even line field in interlace scanning;

FIGS. 23(*a*) through 23(*d*) are timing chart showing an image reduction process in the vertical direction;

FIGS. 24(A) and 24(B) show various parameters concerning image expansion and image reduction;

DESCRIPTION OF THE PREFERRED EMBODIMENT

A. System Structure

Figure 1:
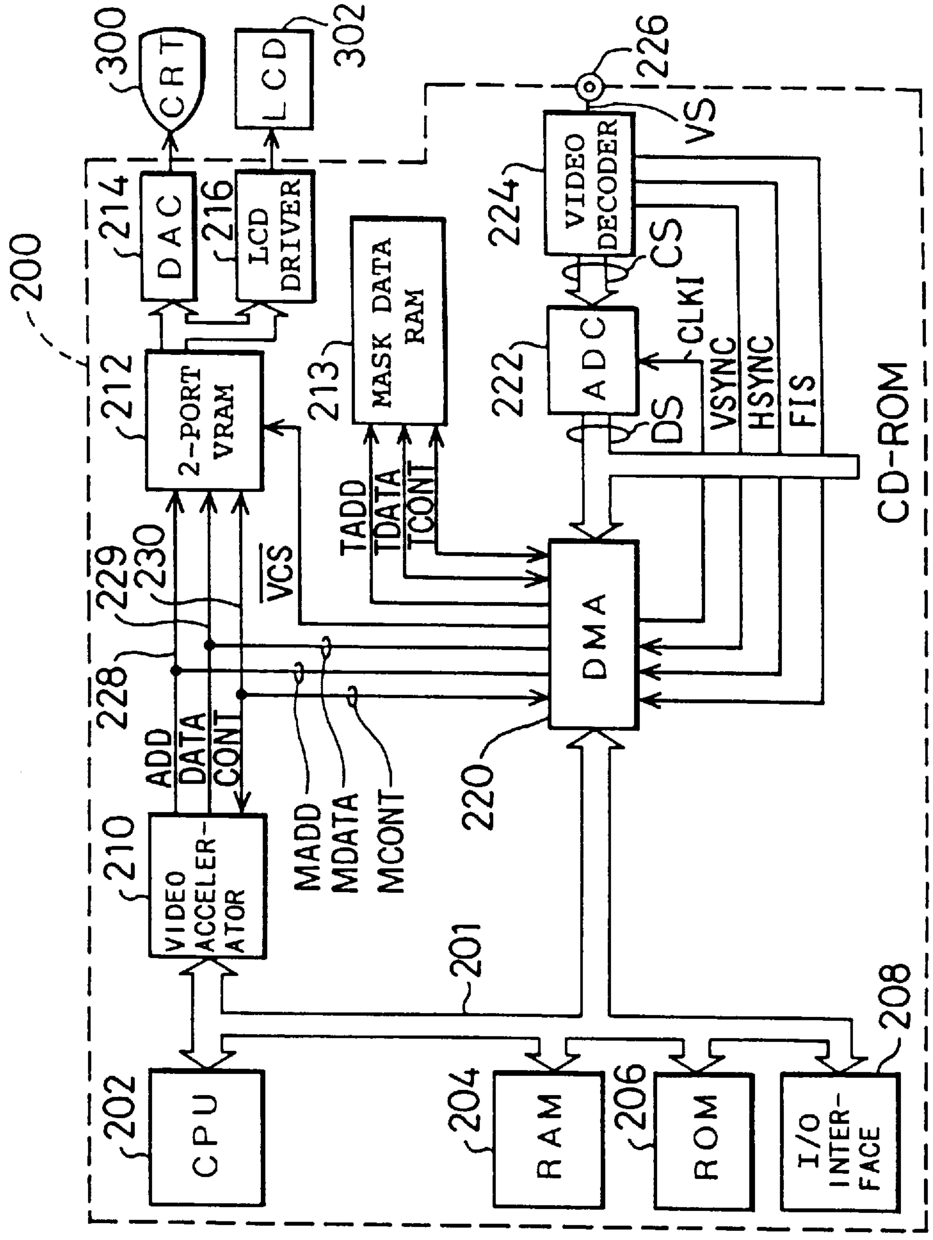
FIG. 1 is a block diagram illustrating the structure of a computer system as a first embodiment according to the invention.

FIG. 1 is a block diagram illustrating the structure of a computer system as a first embodiment according to the invention. The computer system includes a personal computer 200, a color CRT 300, and a color liquid crystal display (LCD) 302. The personal computer 200 includes a CPU 202, a RAM 204, a ROM 206, an I/O interface 208, a video accelerator 210, a dual-port VRAM 212, a mask data RAM 213, a D-A converter (DAC) 214, an LCD driver 216, a DMA controller 220, an A-D converter (ADC) 222, a video decoder 224, and a video input terminal 226. The CPU 202, the RAM 204, the ROM 206, the I/O interface 208, the video accelerator 210, and the DMA controller 220 are connected with one another via a CPU bus 201. The video accelerator 210, the dual-port VRAM 212, and the DMA controller 220 are connected with one another via local buses (an address bus 228, a data bus 229, and a control bus 230). The DMA controller 220 is further connected to the mask data RAM 213 via local buses.

The mask data RAM 213, the DMA controller 220, the A-D converter 222, the video decoder 224, and the video input terminal 226 are mounted on an extension board or an extension card.

The video input terminal 226 receives composite video signals VS transmitted from a video player and a television tuner. The composite video signal VS is decoded by the video decoder 224 and decomposed into color signals CS (component video signals) including luminance data of respective color components R, G, and B, a vertical synchronizing signal VSYNC, a horizontal synchronizing signal HSYNC, and a field indication signal FIS. The field indication signal FIS indicates an odd field and an even field in interlacing scanning.

The A-D converter 222 converts the analog color signals CS to digital video signals DS, which are transmitted to the DMA controller 220. The DMA controller 220 adjusts the number of bits in the digital video data DS and transfers the adjusted video data to the dual-port VRAM 212. The video data read out from the dual-port VRAM 212 are given to the color CRT 300 via the D-A converter 214 as well as to the liquid crystal display 302 via the LCD driver 216.

Figure 2A:
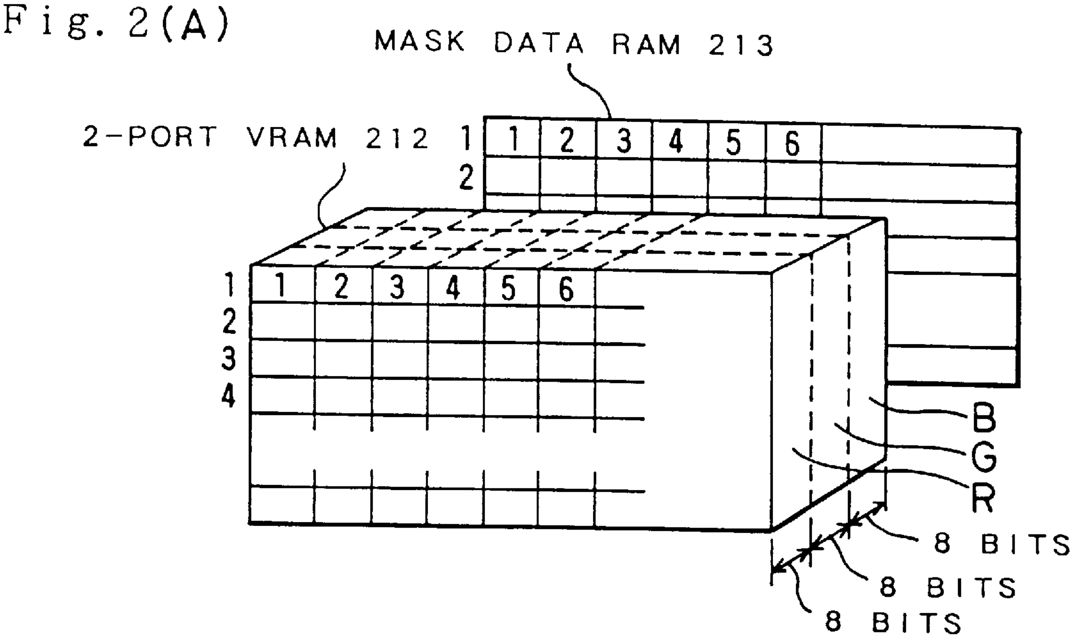
FIGS. 2(A) and 2(B) show the contents of a dual-port VRAM 212 and a mask data RAM 213.
Figure 2B:
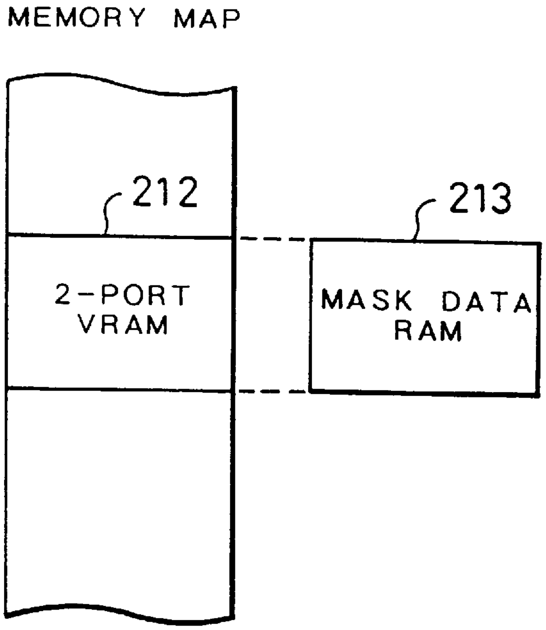

FIGS. 2(A) and 2(B) show the contents of the dual-port VRAM 212 and the mask data RAM 213. As illustrated in FIG. 2(A), the dual-port VRAM 212 is a frame memory for storing 8-bit video data of the respective color components R, G, and B for every dot on a screen of a display device (the color CRT 300 or the liquid crystal display 302). The mask data RAM 213 stores one-bit mask data representing a moving-picture area where a moving picture is to be displayed. The dual-port VRAM 212 and the mask data RAM 213 are mapped in the same address space of the DMA controller 220 as illustrated in FIG. 2(B).

Moving picture data are transferred to the dual-port RAM 212 by the DMA transfer in an area where the mask data is at the H level, and the DMA transfer is prohibited in the other area there the mask data is at the L level. This means that moving pictures in the area of the H-level mask data are displayed on the display device, and that no moving pictures but only background and still pictures are displayed in the other area of the L-level mask data. The operation of displaying a moving picture according to the mask data will be described later in detail.

Figure 3:
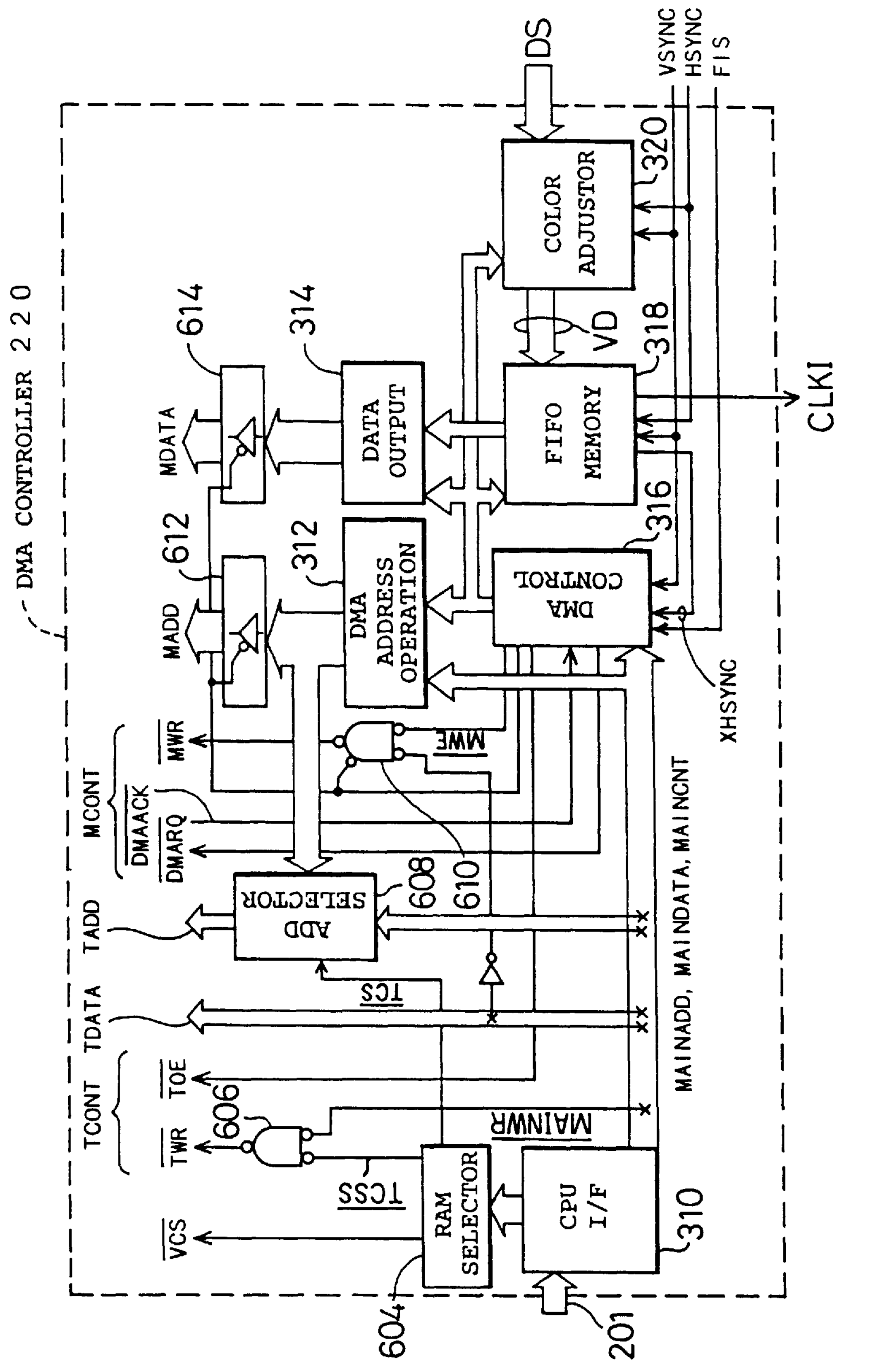
FIG. 3 is a block diagram showing the internal structure of a DMA controller 220.

FIG. 3 is a block diagram showing the internal structure of the DMA controller 220. The DMA controller 220 includes a CPU interface 310, a RAM selector 604, an OR gate 606, an address selector 608, a tri-state OR gate 610, two tri-state buffer circuits 612 and 614, a DMA address operation unit 312, a data output unit 314, a DMA control unit 316, a FIFO memory unit 318, and a color adjustor 320. The digital video signals DS given to the color adjustor 320 are 24-bit full-color video data, where 8 bits are allocated to each of the color components R, G, and B. The color adjustor 320 converts the 24-bit digital video signals DS to 16-bit video data reproducing 16,770 thousand colors at a ratio of R:G:B=5:6:5 bits, 8-bit video data reproducing 60 thousand colors at a ratio of R:G:B=3:3:2 bits, 4-bit video data reproducing 16 colors by means of a color palette, or 3-bit video data reproducing 8 colors by means of the color palette, if required. Binarization according to the Dither Method is applicable to the conversion to the 4-bit or 3-bit video data. The color palette may be disposed at the output of the dual-port VRAM 212. In actual operation, the CPU 202 sets the type of the video data conversion in the color adjustor 320 according to an instruction of the operator. Description below is, however, made on the case where the color adjustor 320 outputs the 24-bit full-color video data, hereinafter referred to as the component video data, without data conversion.

The FIFO memory unit 318 temporarily stores video data VD transferred from the color adjustor 320 into two internal FIFO memories, and adjusts the timing of data transfer. The video data VD(=MDATA) output from the FIFO memory unit 318 are latched by the data output unit 314 and output onto the local data bus 229 (FIG. 1) via the tri-state buffer circuit 614.

The DMA control unit 316 obtains the right of use of the address bus 228, the data bus 229, and the control bus 230 from the video accelerator 210, and transfers the video data MDATA to the dual-port VRAM 212. The DMA address operation unit 312 calculates an address to supply the same to the dual-port VRAM 212 via the tri-state buffer circuit 612 and the address bus 228.

Control signals MCONT concerning the transfer of the video data MDATA include a DMA request signal /DMARQ, a DMA acknowledge signal /DMAACK, and a write signal /MWR. The symbol '/' affixed to signal names in the specification denotes negative logic, which is expressed with a line drawn over the respective signal names in the drawings. The DMA control unit 316 outputs the DMA request signal /DMARQ to the video accelerator 210 to request the DMA transfer. The video accelerator 210 outputs the DMA acknowledge signal /DMAACK to the DMA control unit 316 to acknowledge the DMA transfer. The write signal /MWR indicates a timing to write video data in the dual-port VRAM 212.

Signals transmitted between the DMA controller 220 and the mask data RAM 213 include an address TADD, mask data TDATA, and control signals TCONT. The control signals TCONT include a write signal /TWR for the mask data RAM 213 and an output enable signal /TOE. The write signal /TWR is output from the OR gate 606, and the output enable signal /TOE is output from the DMA control unit 316.

The address selector 608 receives the address MADD from the DMA address operation unit 312 and another address MAINADD from the CPU 202 via the CPU interface 310, and selects one of the two addresses MADD and MAINADD as the address TADD given to the mask data RAM 213. The address selector 608 selects the address in response to a select signal /TCS output from the RAM selector 604.

The RAM selector 604 outputs, other than the select signal /TCS, a chip select signal /VCS for activating a write port of the dual-port VRAM 212 and another chip select signal /TCSS for allowing mask data to be written into the mask data RAM 213. The RAM selector 604 includes latches for storing the levels of the respective signals /TCS, /VCS, and /TCSS specified by the CPU 202 via the CPU interface 310.

The OR gate 606 obtains a negative logical product of the chip select signal /TCSS for the mask data RAM 213 and a write signal /MAINWR transmitted from the CPU 202 via the CPU interface 310, and outputs the write signal /TWR to the mask data RAM 213. Mask data are written into the mask data RAM 213 while the write signal /TWR is set at the L level as described later. When video data are written into the dual-port VRAM 212, the chip select signal /TCSS falls to the L level whereas the write signal /MAINWR given from the CPU 202 and the write signal /TWR are kept at the H level. This makes it impossible to write data into the mask data RAM 213. The write signal /TWR falls to the L level only when mask data are to be written into the mask data RAM 213.

The tri-state OR gate 610 masks a write signal /MWE output from the DMA control unit 316 with the mask data TDATA, when video data are transferred to the dual-port VRAM 212. While the mask data TDATA is at the H level, the write signal /MWE output from the DMA control unit 316 pass through the tri-state OR gate 610 and is given as the write signal /MWR to the dual-port VRAM 212. While the mask data TDATA is at the L level, on the contrary, the write signal /MWE output from the DMA control unit 316 is blocked by the tri-state OR gate 610, so that the write signal /WR given to the dual-port VRAM 212 is kept at the L level. Details of such operations will be described later.

The tri-state OR gate 610 and the two tri-state buffers 612 and 614 are set in the high impedance state while the video accelerator 210 is operating.

Figure 4:
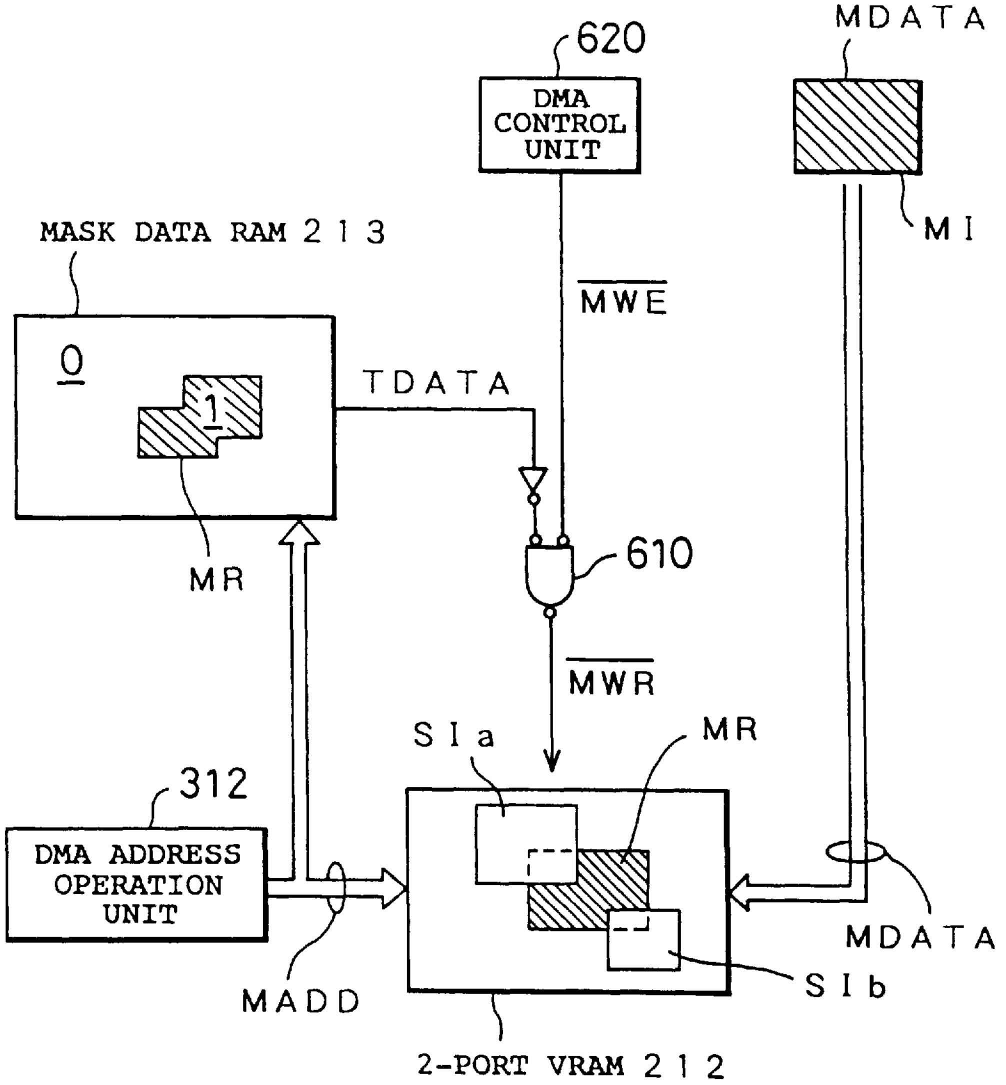
FIG. 4 shows a process of DMA-transfer to transfer video data MDATA in a specified display area of an arbitrary shape to the dual-port VRAM 212 by utilizing mask data.

FIG. 4 shows a process of the DMA transfer of video data in a specific area of an arbitrary shape to the dual-port VRAM 212 by utilizing the mask data. A moving picture image MI represented by the video data MDATA generally has an image area of a rectangular shape. The DMA address operation unit 312 generates an address MADD for each dot in the rectangular area of the moving picture image MI within the address space of the dual-port VRAM, and gives the address MADD to the dual-port VRAM 212. The address MADD is also given to the mask data RAM 213. While the video data MDATA representing each dot of the moving picture image MI are transmitted to the dual-port VRAM 212, the mask data TDATA of each dot are read out from the mask data RAM 213 to be input into the OR gate 610.

The mask data TDATA stored in the mask data RAM 213 has a value '1', or H level, with respect to the moving picture write-in area MR in the dual-port VRAM 212 into which video data is to be written. The mask data TDATA has another value '0', or L level, for areas other than the moving picture write-in area MR. Since the moving picture write-in area in the dual-port VRAM 212 corresponds to a moving picture display area on the display device where a moving picture is to be displayed, both the moving picture write-in area and the moving picture display area are referred to as 'moving picture area' below.

The OR gate 610 obtains a negative logical product of the mask data TDATA and the write signal /MWE output from the DMA control unit 316, and gives its output, or the write signal /MWR, to the dual-port VRAM 212. The mask data TDATA having a value '1' allows the video data MDATA to be written into the dual-port VRAM 212, whereas the mask data TDATA having another value '0' prevents the video data MDATA from being written into the dual-port VRAM 212.

In the example of FIG. 4, video data representing still picture images SIa and SIb are written by the video accelerator 210 in a memory area adjacent to the moving picture area MR in the dual-port VRAM 212. Accordingly, the moving picture is displayed while parts of the moving picture are shielded by the still picture images SIa and SIb, in response to the video data stored in the dual-port VRAM 212. The high-speed DMA transfer of the video data MDATA representing the moving picture attains smooth movement of the picture image in the moving picture area MR.

The moving-picture video data MDATA in the moving picture area of an arbitrary shape can be transferred to the dual-port VRAM 212 by varying the mask data TDATA. The mask data TDATA has a function of masking a part of the rectangular moving picture image MI. The position and the shape of the moving picture area on the screen can be changed by adjusting the DMA address MADD and the mask data TDATA. The moving picture in the moving picture area of an arbitrary shape can be expanded or reduced at a desirable ratio both in the horizontal direction and the vertical direction as will be described later in detail.

The circuit of the above first embodiment is so simply constructed that the level of the write signal /MWR is adjusted by the OR gate 610 to control the writing of the video data MDATA into the dual-port VRAM 212. The video data MDATA and the address MADD are output onto the bus in the usual manner of the DMA transfer of the rectangular moving picture image MI. This does not require any time-consuming adjustment of the video data MDATA or the address MADD according to the arbitrary shape of the moving picture area. Since the DMA transfer itself is a simple process and does not require much time, this feature of the embodiment attains the high-speed DMA transfer of the video data.

Conventional computer systems requires an additional video memory to store a moving picture image other than a frame memory in order to display a moving picture along with a still picture on the screen. On the other hand, the computer system of the above embodiment can display a moving picture and still images without additional video memories for a moving picture image.

B. Process of Writing Mask Data

Figure 5:
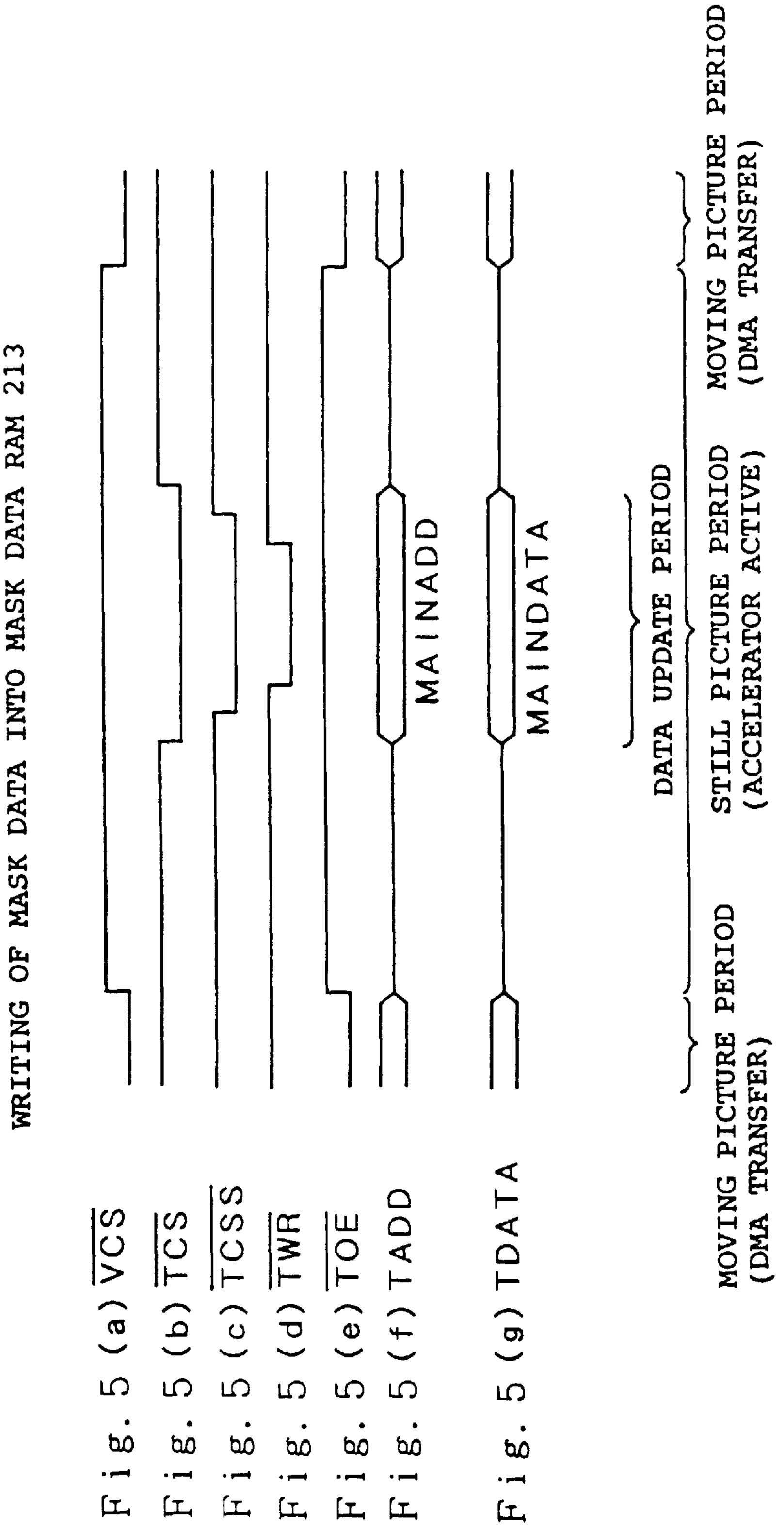
FIGS. 5(*a*) through 5(*g*) are timing charts showing timings of writing mask data into the mask data RAM 213.

FIGS. 5(*a*) through 5(*g*) are timing charts showing the process of writing mask data into the mask data RAM 213. The writing of mask data into the mask data RAM 213 is executed during the period when the video accelerator 210 has access to the dual-port VRAM 212, hereinafter referred to as "still picture period". In the still picture period, the chip select signal /VCS for activating the write port of the dual-port VRAM 212 is kept at the H level to prohibit the writing into the dual-port VRAM 212, while the output enable signal /TOE output from the DMA control unit 316 is kept at the H level to allow mask data to be written into the mask data RAM 213. The writing into the dual-port VRAM 212 is prohibited by the chip select signal /VCS because the two RAMs 212 and 213 are mapped to have the same address area. The H-level state of the chip select signal /VCS effectively prevents the mask data from being mistakenly written into the dual-port VRAM 212.

When the select signal /TCS given to the address selector 608 (FIG. 3) falls to the L level, the address selector 608 selects the address MAINADD output from the CPU 202 and transmits the selected address MAINADD to the mask data RAM 213. Meanwhile, mask data MAINDATA(= TDATA) output from the CPU 202 are transmitted to the mask data RAM 213 via the CPU interface 310. The chip select signal /TCSS then falls to the L level to open the OR gate 606, and the mask data TDATA is written into the mask data RAM 213 while the write signal /TWR is kept at the L level.

During a moving picture period, or a DMA transfer period, the mask data TDATA are read out from the mask data RAM 213 to be applied for the masking process of the moving picture as illustrated in FIG. 4.

The writing of the mask data TDATA into the mask data RAM 213 is not a DMA transfer but executed by the CPU 202. The system structure can be modified so that the mask data RAM 213 is implemented with another dual port RAM connected with the CPU bus 201. According to the modified structure, the mask data TDATA can written directly from the CPU 202 into the mask data RAM 213.

Figure 6:
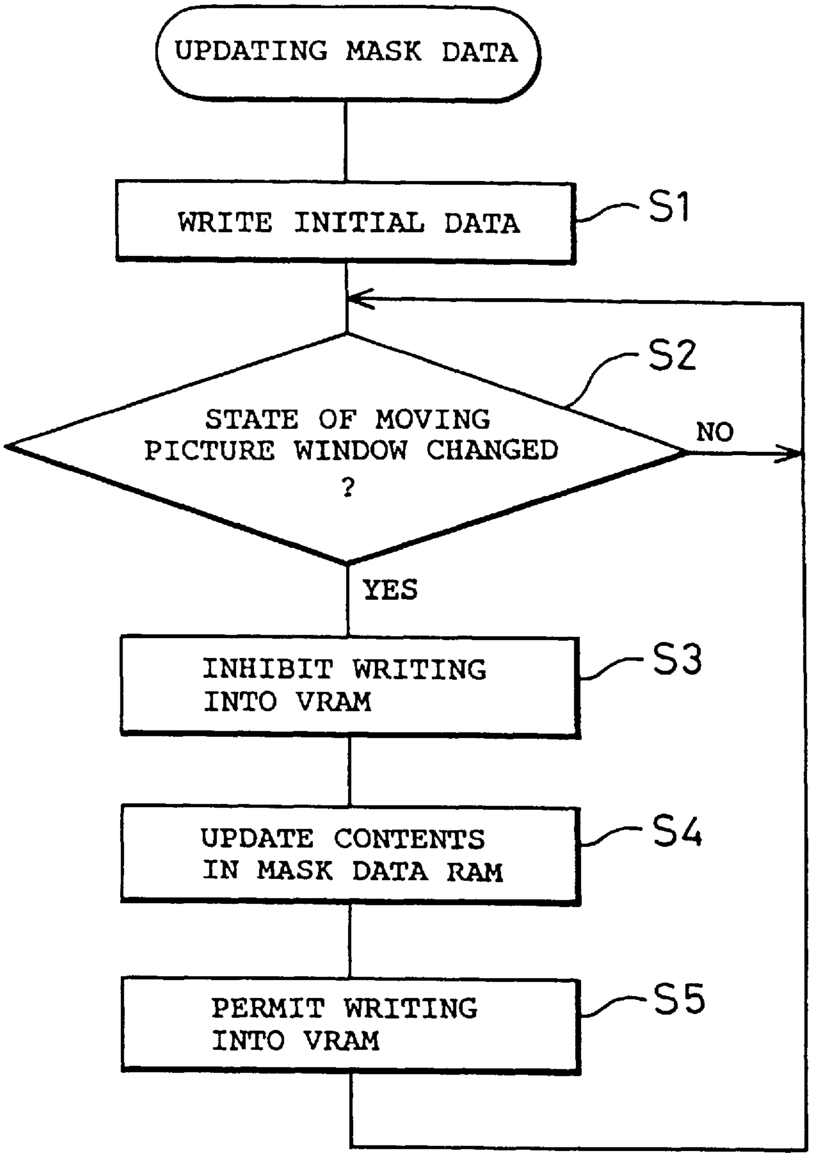
FIG. 6 is a flowchart showing a routine of updating mask data.

FIG. 6 is a flowchart showing a routine of updating mask data. At step S1, initial mask data are written in the mask data RAM 213, which usually represents a rectangular moving picture area.

At step S2, the CPU 202 monitors whether a state of a moving picture window is changed by the operator on the screen of the display device. The moving picture window is a moving picture display area on the screen and corresponds to a moving picture write-in area in the dual-port VRAM 212. The state of the moving picture window is changed when the size or the position of the moving picture window itself is changed; when the size or the position of a still picture window overlapping the moving picture window is changed; and when a positional relationship or overlapping priorities between the moving picture window and the still picture window are changed.

When the state of the moving picture window is changed, the process goes to step S3 at which the chip select signal /VCS rises to the H level to prohibit the wiring into the dual-port VRAM 212. At step S4, the CPU 202 writes new mask data into the mask data RAM 213 to revise the mask data stored in the mask data RAM 213. At step S5, the chip select signal /VCS falls to the L level to allow the writing into the dual-port VRAM 212.

Every time when the operator modifies a moving picture window or a still picture window on the display device to vary the position or the shape of the moving picture window, the CPU 202 updates the mask data in the mask data RAM 213. The mask data updating routine shown in the flowchart of FIG. 6 is implemented by a driver program working as an interface between hardware circuits and application programs.

C. DMA Transfer of Moving-Picture Video Data

Figure 7:
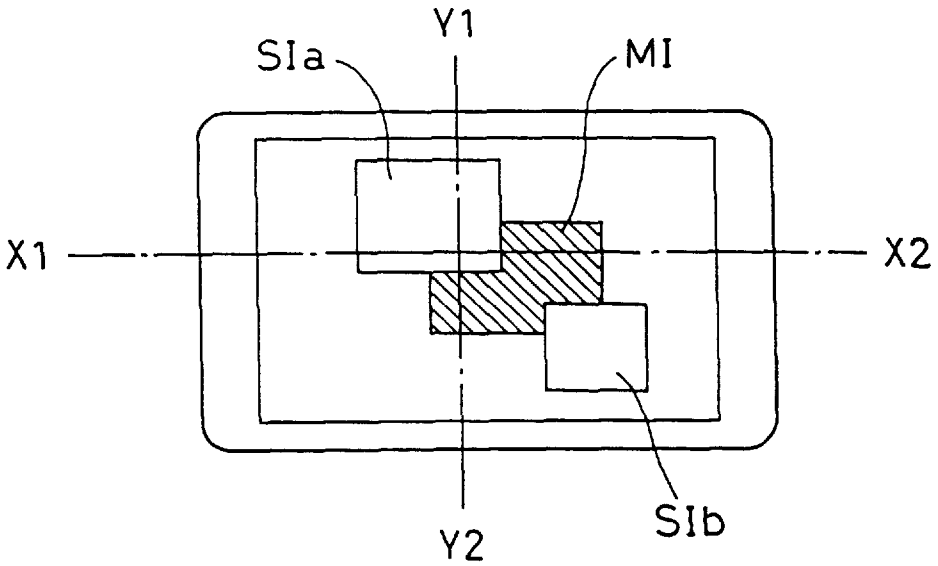
FIG. 7 shows video images displayed on a display device.

FIG. 7 shows images displayed on a display device (the color CRT 300 or the liquid crystal display 302). A moving picture image MI is shown behind windows of two still picture images SIa and SIb on the screen. Video data of the moving picture image MI are DMA-transferred to the dual-port VRAM 212 at a rate of 30 frames per second (60 fields per second). Operations of the DMA transfer in a vertical direction (along the line Y1–Y2) and in a horizontal direction (along the line X1–X2) are described below.

FIGS. 8(*a*) through 8(*m*) are timing charts showing the DMA transfer operation in the vertical direction. When the CPU 202 gives an instruction to start the operation to the DMA control unit 316 (FIG. 3) as shown in FIG. 8(*a*), the DMA control unit 316 outputs a DMA request signal /DMARQ onto the control bus 230. The video accelerator 210 transmits a DMA acknowledge signal /DMAACK to the DMA control unit 316, so that the DMA controller 220 obtains the right of use of the local buses 228, 229, and 230.

The DMA controller 220 is reset to its initial state in response to a pulse of the vertical synchronizing signal VSYNC given to the DMA controller 220 after the instruction of DMA transfer from the CPU 202.

The pulse of the vertical synchronizing signal VSYNC is followed by a back porch period, whose details are omitted in the timing charts. While the DMA acknowledge signal /DMAACK (FIG. 8(*f*)) is kept at the L level in an effective video period after the back porch period, the DMA controller 220 outputs an address MADD (FIG. 8(*g*)), video data MDATA (FIG. 8(*h*)), and a write signal /MWR (FIG. 8(*i*)) onto the local buses for the DMA transfer. The same address is given to both the mask data RAM 213 and the dual-port VRAM 212, and mask data TDATA (FIG. 8(*j*)) corresponding to the position and shape of a moving picture window are read out from the mask data RAM 213. With the mask data TDATA, the masking process shown in FIG. 4 is executed on the write signal /MWE. While the DMA acknowledge signal /DMAACK is at the H level, the video accelerator 210 has the right of use on the local buses (FIGS. 8(*k*) through 8(*m*)).

FIGS. 9(*a*) through 9(*m*) are timing charts showing the DMA transfer operation in the horizontal direction, which are executed during one cycle of a horizontal synchronizing signal XHSYNC of FIG. 8(*d*). The horizontal synchronizing signal XHSYNC is generated by the FIFO memory unit 318 (FIG. 3), based on the first horizontal synchronizing signal HSYNC supplied from the video decoder 224 (FIG. 1). The horizontal synchronizing signal XHSYNC defines a period of one horizontal line of the moving-picture video data MDATA written into the dual-port VRAM 212.

As shown in the timing charts of FIGS. 9(*a*) through 9(*d*), the address MADD and the video data MDATA are output onto the local buses for the DMA transfer while the DMA acknowledge signal /DMAACK is kept at the L level. While the mask data TDATA is at the L level, the write signal /MWR given to the dual-port VRAM 212 is kept at the H level to prohibit the writing of the video data MDATA into the dual-port VRAM 212. While the mask data TDATA is at the H level, on the other hand, the write signal /MWR falls to the L level for each dot to allow the video data MDATA, or RGB data, for each dot to be written into the dual-port VRAM 212.

FIGS. 10(*a*) through 10(*d*) are timing charts showing details of part A near a rise of the mask data TDATA in FIGS. 9(*g*) through 9(*j*). The address MADD(=TADD) and the video data MDATA are updated for each dot, or each pixel, on the screen as shown in FIG. 10(*a*). The write signal /MWR falls to the L level only when the mask data TDATA is at the H level. The fall of the write signal /MWR allows the video data MDATA to be written into the dual-port VRAM 212.

In the above embodiment, the same address MADD(=TADD) is given to both the dual-port VRAM 212 and the mask data RAM 213 during the DMA transfer, so as to allow the mask data TDATA to be read out with respect to each dot of the video data MDATA on the screen. The process of writing the video data MDATA into the dual-port VRAM 212 is controlled by the level of the mask data TDATA. Since the mask data TDATA is updated according to the position and the shape of the moving picture window, or the moving picture area, as described previously, a moving picture image of an arbitrary shape can be displayed at a desirable position on the screen.

D. Modifications of First Embodiment (1) In the above first embodiment, the writing of the video data is controlled by changing the level of the write signal /MWR in response to the mask data TDATA. Alternatively, a write per bit mode, a specific function of video RAMs, can be used to prohibit the writing into the dual-port VRAM 212 for each bit.

Figure 11:
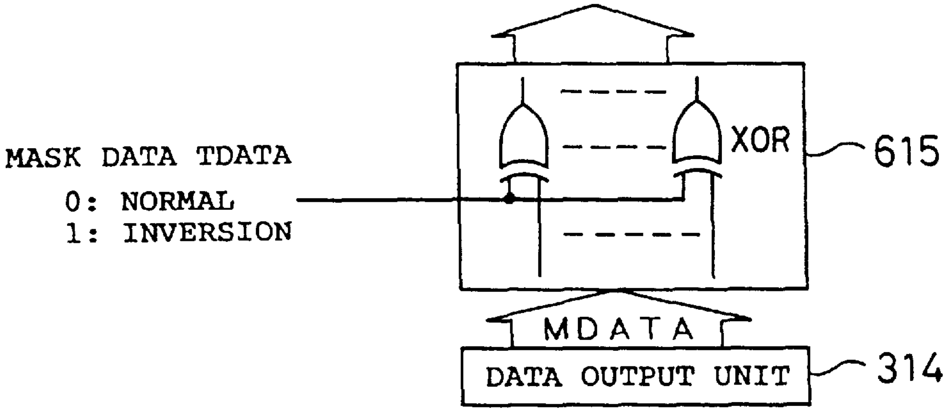
FIG. 11 shows part of a circuit structure for inverting bits of moving-picture video data.

(2) Instead of using the mask data TDATA to control the writing of the video data, the mask data can be used to execute bit inversion of video data to change the color of a moving picture represented by the video data. FIG. 11 shows part of a circuit structure for the bit inversion of moving-picture video data. A bit inverting circuit 615, disposed after the data output unit 314 (FIG. 3), includes a number of EXOR circuits, or exclusive ORS, corresponding to the number of bits of the video data. One input terminal of each EXOR circuit receives the mask data TDATA while the other input terminal receives each bit of the video data MDATA. When the mask data TDATA is equal to zero, the video data MDATA simply passes through the bit inverting circuit 615. When the mask data TDATA is equal to one, on the contrary, each bit of the video data MDATA is inverted. This allows the color of the video data MDATA to be changed at the dots whose mask data TDATA has the value '1'.

E. Internal Structure of DMA Controller 220

The DMA controller 220 shown in FIG. 3 has a function of calculating addresses for DMA transfer of moving-picture video data as well as a function of arbitrarily expanding or reducing a moving picture both in the vertical direction and the horizontal direction. The description given below regards the circuit structure related to these functions.

Figure 12A:
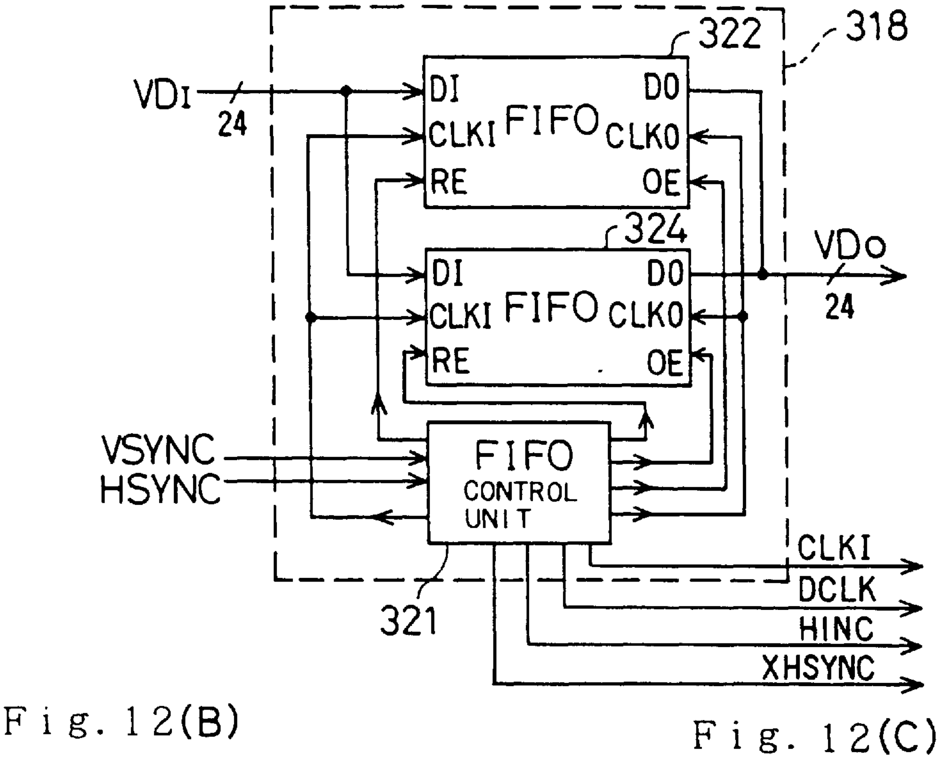
FIGS. 12(A) and 12(B) are block diagrams illustrating the internal structure of a FIFO memory unit 318.
Figure 12B:
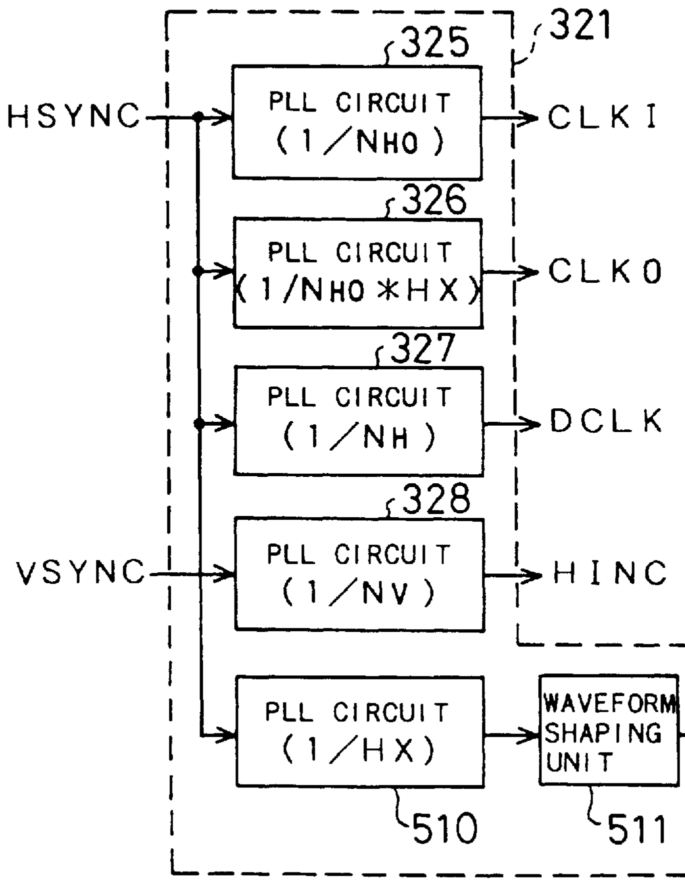
Figure 12C:
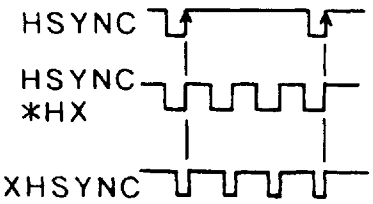
FIG. 12(C) is a timing chart showing the operation of a PLL circuit 510.

FIGS. 12(A) and 12(B) are block diagrams showing the internal structure of the FIFO memory unit 318. As shown in FIG. 12(A), the FIFO memory unit 318 comprises an FIFO control unit 321, two FIFO memories 322 and 324. As shown in FIG. 12(B), the FIFO control unit 321 comprises five PLL (Phase Locked Loop) circuits 325–328, and 510, and a waveform shaping unit 511. The first through third PLL circuits 325–327 generate clock signals CLKI, CLKO, and DCLK, whose frequencies are NHO times, (NHO*HX) times, and NH times that of the horizontal synchronizing signal HSYNC, respectively. The fourth PLL circuit 328 generates a signal HINC whose frequency is Nv times that of the vertical synchronizing signal VSYNC. The fifth PLL circuit 510 generates, as shown in FIG. 12(C), a signal HSYNC*HX whose frequency is HX times that of the horizontal synchronizing signal HSYNC. The waveform shaping unit 511 detects rise edges of the signal HSYNC*HX to generate a second horizontal synchronizing signal XHSYNC. The frequency of the second horizontal synchronizing signal XHSYNC is HX times that of the first horizontal synchronizing signal HSYNC. The values NHO, (NHO*HX), NH, Nv, and HX are set in the PLL circuits by the CPU 202. The PLL circuits 325–328 executes image expansion and image reduction, and the functions of these circuits will be described later in detail.

The two FIFO memories 322 and 324 function as video data buffers for temporarily storing a predetermined volume of video data, whereas the FIFO control unit 321 works as a video data buffer control unit. The first PLL circuit 325 functions as input clock generating means, the second PLL circuit 326 as output clock generating means, the third PLL circuit 327 as dot clock generating means, and the fourth PLL circuit 328 as line increment signal generating means. The second and the fourth PLL circuits 326 and 328 work, in combination with the FIFO memory unit 318, as first magnifying means for expanding or reducing a video image represented by video data in the vertical direction. The second and the third PLL circuits 326 and 327 work as second magnifying means for expanding or reducing a video image represented by video data in the horizontal direction.

As shown in FIG. 3, the FIFO memory unit 318 outputs the video data on the data bus 229 through the data output unit 314. The DMA control unit 316 then obtains the right of use of the address bus 228, the data bus 229, and the control bus 230 from the video accelerator 210, and transfers the video data MDATA to the dual port VRAM 212.

Figure 13:
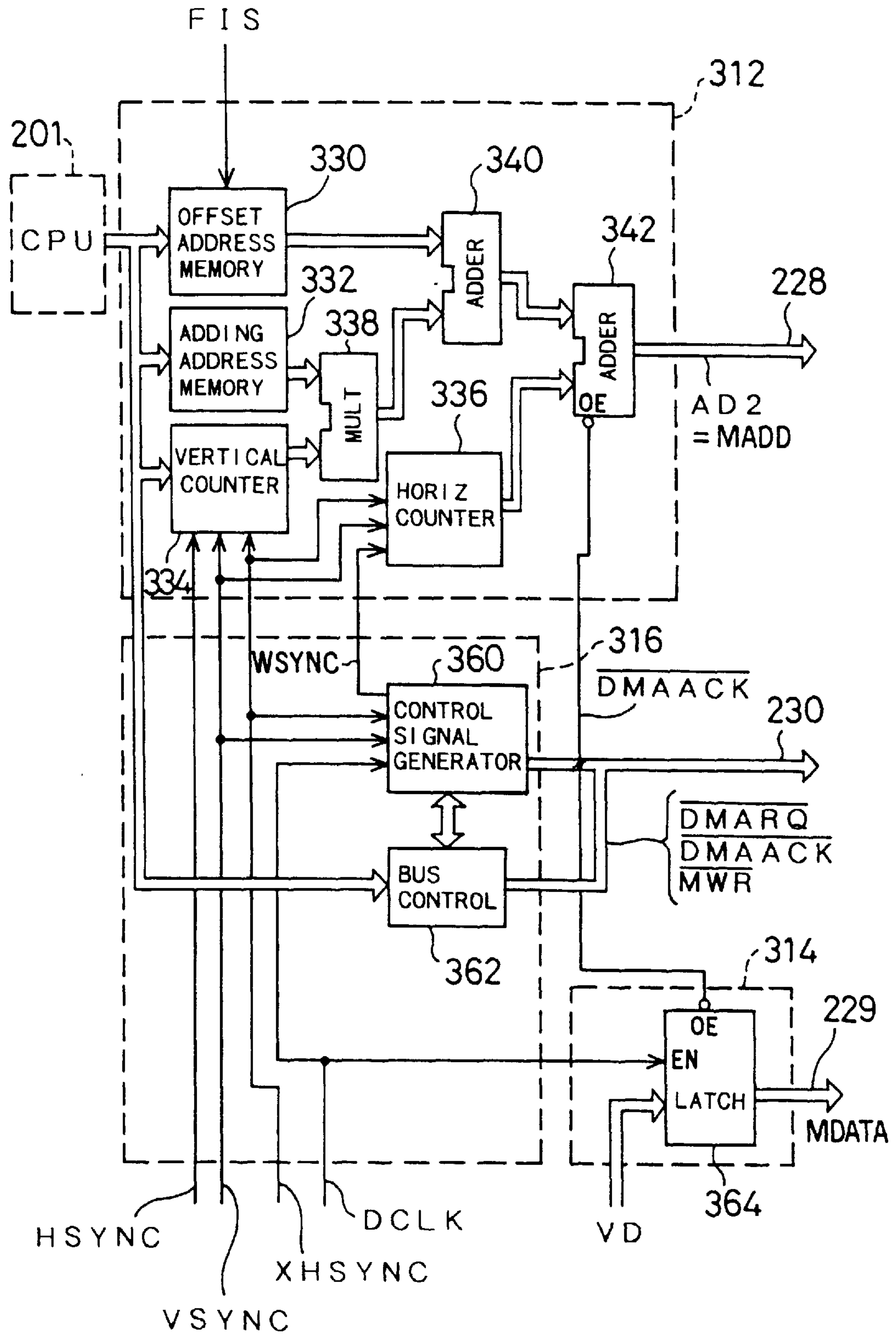
FIG. 13 is a block diagram showing the internal structure of a DMA address computation unit 312, a data output unit 314, and a DMA control unit 316.

FIG. 13 is a block diagram showing the internal structure of the DMA address operation unit 312, the data output unit 314, and the DMA control unit 316 in the DMA controller 220. The data output unit 314 comprises a latch 364 for storing the component video data VD. The data output unit 314 may further comprise a serial-to-parallel converter in order to simultaneously output the component video data VD for a plurality of pixels on the data bus 229.

The DMA address operation unit 312 comprises an offset address memory unit 330; an adding address memory unit 332; a vertical counter unit 334; a horizontal counter unit 336; a multiplier 338; and two adders 340 and 342. The multiplier 338 multiplies an adding address stored in the adding address memory unit 332 by a vertical count of the vertical counter unit 334. The first adder 340 adds the product in the multiplier 338 to an offset address (described later) stored in advance in the offset address memory unit 330. The second adder 342 adds the sum obtained by the first adder 340 to a horizontal count of the horizontal counter unit 336. An output AD2 from the second adder 342 becomes an address MADD, which is given to the VRAM 212 in the DMA transfer operation. The second adder 342 has a tri-state output.

F. Address Operation

Figure 14:
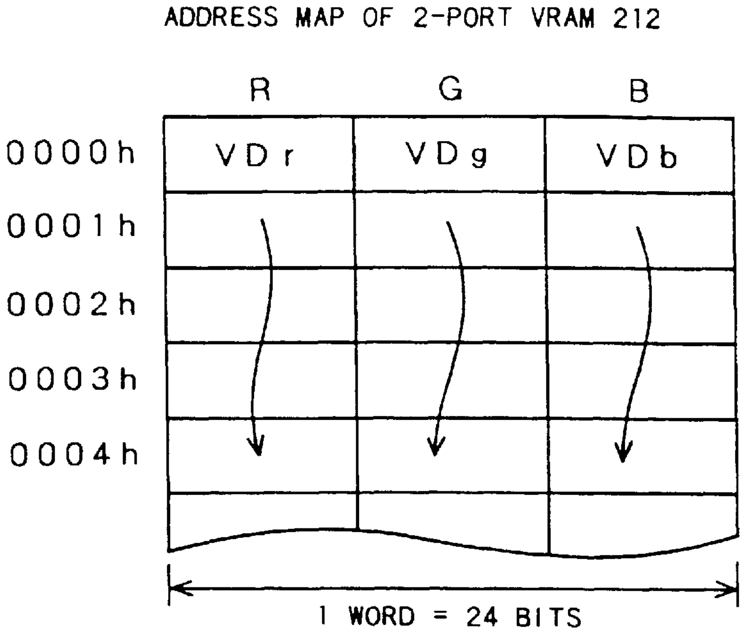
FIG. 14 is an address map of a dual-port VRAM 212.

FIG. 14 is a memory map of the dual port VRAM 212. One word in the VRAM 212 is constituted by 24 bits, which include R, G, and B components of the video data. One word corresponds to one pixel on a display screen.

Figure 15:
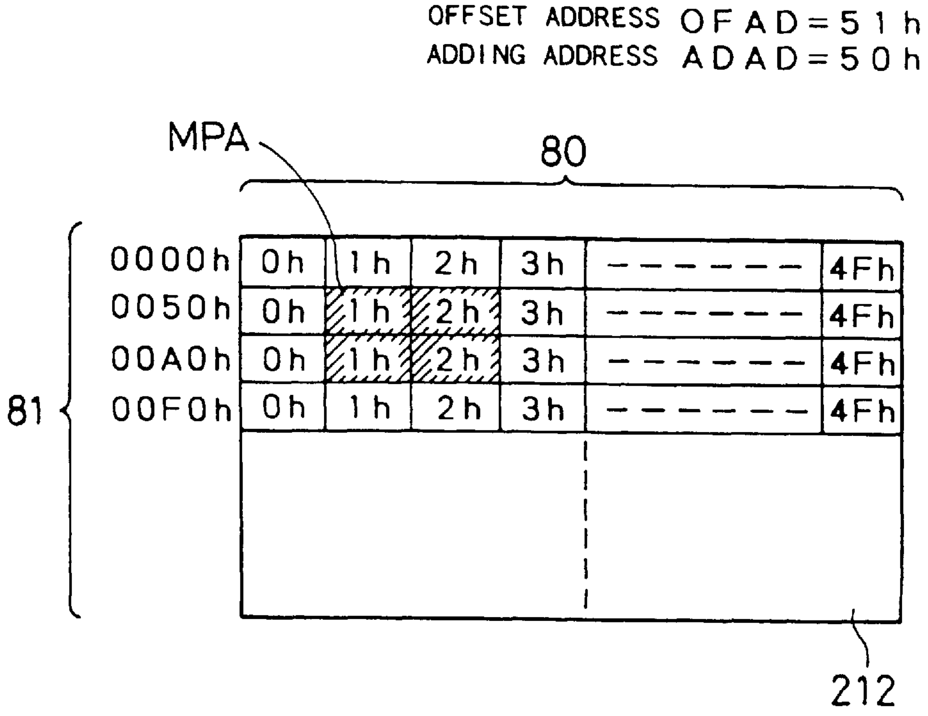
FIG. 15 shows a memory space of the dual port VRAM 212 corresponding to a display screen.

FIG. 15 shows a relationship between the memory space of the VRAM 212 and the display screen. A horizontal range 80 of the VRAM 212 corresponds to 640 pixels, corresponding to 50h bytes, and a vertical range 81 corresponds to 199h (=409) scanning lines. In this embodiment, a moving picture area MPA, shaded in FIG. 15, in which the video data of a moving picture is written through DMA transfer, has a 2-byte horizontal width from the second byte and a 2-line vertical width from the second line. The moving picture area MPA in the memory space corresponds to an area specified by the operator on the screen of the color CRT 300 or the color LCD 302.

Although the moving picture area MPA is rectangular in shape, the video data corresponding to a part of the moving picture area MPA, that is, the moving picture display area MR, are written into the dual-port VRAM 212 according to the mask data TDATA as illustrated in FIG. 4.

Figure 16:
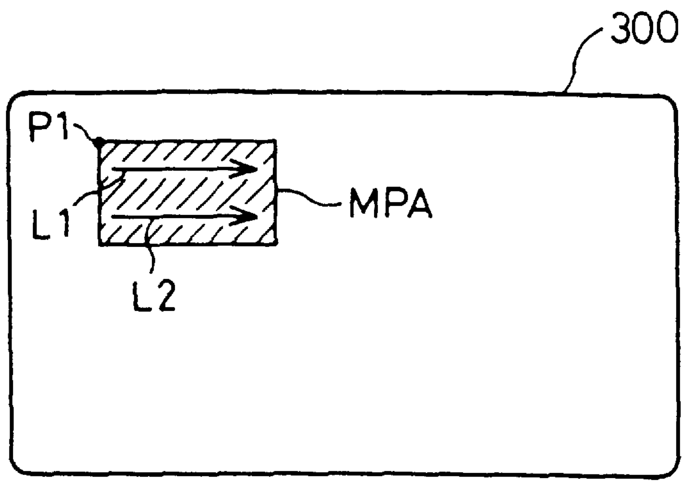
FIG. 16 is a plan view showing a moving picture area MPA in a display screen.

FIG. 16 is a plan view showing the moving picture area MPA specified on the display screen. The memory space shown in FIG. 15 uniquely corresponds to the display screen shown in FIG. 16. Explanation will be made for the case without the interlace scanning for convenience of simplicity.

Figure 17:
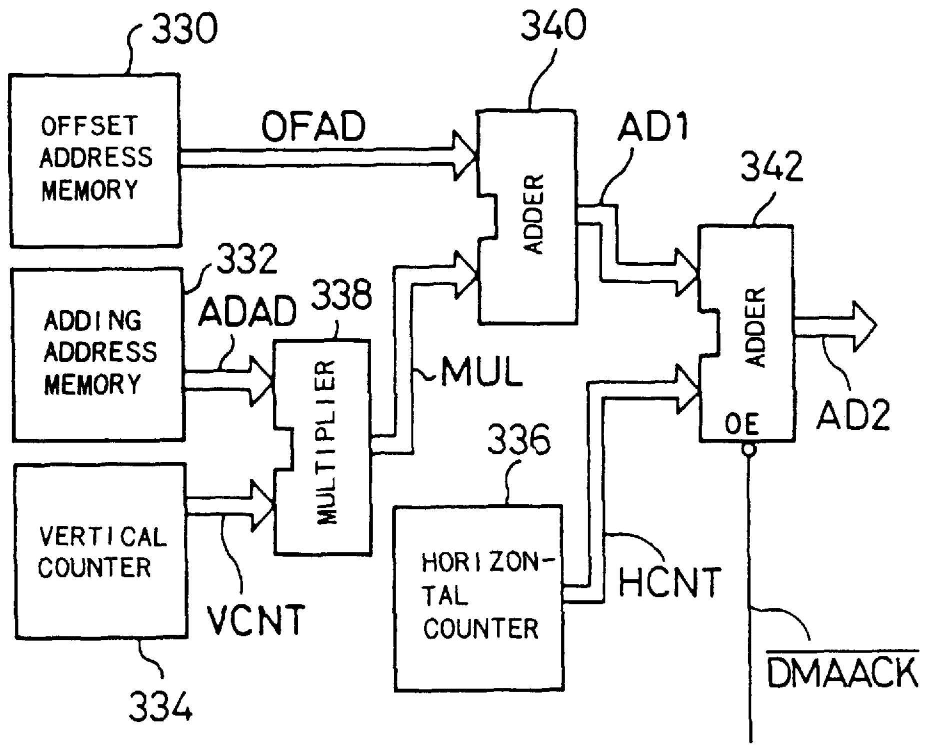
FIG. 17 is a block diagram showing details of an address operation unit 312 in the DMA controller 220.

FIG. 17 is an enlarged block diagram showing the structure of the address operation unit 312 in the DMA controller 220. An offset address OFAD stored in the offset address memory unit 330 represents an offset value (=51h) between the start address (=0000h) and the address (=0051h) at a writing start position of the moving picture area MPA shown in FIG. 15. The writing start address (=0051h) is determined according to the position of a left upper point P1 of the moving picture area MPA specified on the screen by the operator (FIG. 16). When the operator specifies a moving picture area MPA on the screen, the CPU 202 calculates the writing start address (=0051h) corresponding to the left upper point P1, and writes the start address (=0051h) as the offset address OFAD in the offset address memory unit 330. The operator can set a moving picture area MPA of desirable dimensions at a desirable position on the screen, and the offset address OFAD is determined accordingly.

An adding address ADAD stored in the adding address memory unit 332 is equal to the number of pixels on one scanning line in the memory space, and is set at 50h in this embodiment.

An output MUL of the multiplier 338 and outputs AD1 and AD2 of the two adders 340 and 342 are respectively given as follows:

$$MUL=ADAD\times VCNT \qquad (1)$$

$$AD1=OFAD+MUL \qquad (2)$$

$$AD2=AD1+HCNT \qquad (3)$$

The output AD2 from the second adder 342 is given as follows from the above equations (1) through (3):

$$AD2=(ADAD\times VCNT)+OFAD+HCNT \qquad (4)$$

The vertical count VCNT indicates an ordinal number of scanning line in the moving picture area MPA. The horizontal count HCNT indicates a position from the left end point on each scanning line in the unit of dot, and corresponds to the horizontal address in the present invention. The output MUL of the multiplier 338 corresponds to the vertical address in the present invention.

The equation (4) gives the address AD2 for a position defined by the vertical count VCNT and the horizontal count HCNT. Since ADAD=50h and OFAD=51h in this embodiment, the equation (4) is rewritten as follows:

$$AD2=(50h\times VCNT)+51h+HCNT \qquad (5)$$

As described later, the vertical count VCNT is increased by one every time when the DMA transfer of each scanning line is completed in the moving picture area MPA (FIG. 16), and the horizontal count HCNT is increased by one every time when the video data for one word is DMA-transferred on a scanning line. As a result, the component video data VD representing a video image within the moving picture area MPA are written in the VRAM 212 according to the address given by the equation (511).

G. Details of Data Transfer Operation

Figure 18:
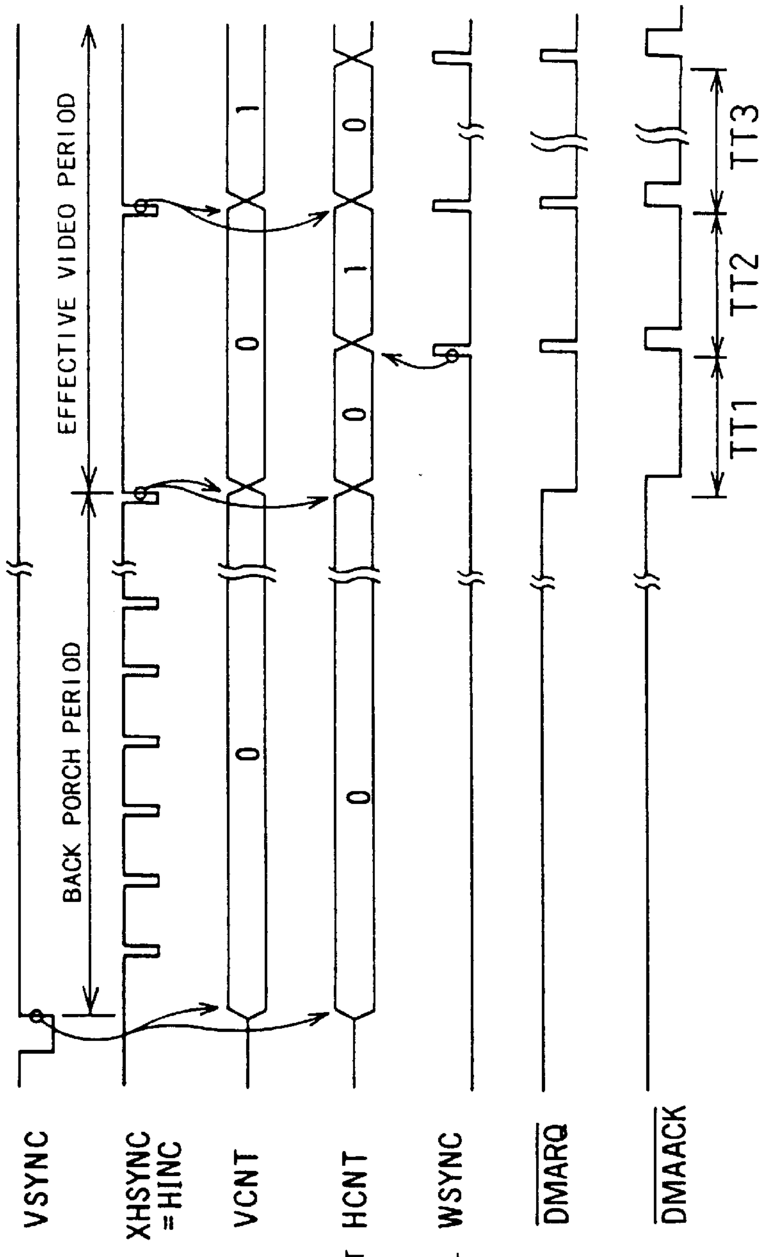
FIGS. 18(*a*) through 18(*g*) are timing charts showing details of the DMA transfer.

FIGS. 18(*a*) through 18(*g*) are timing charts showing details of the DMA transfer operation shown in FIGS. 8(*a*) through 8(*m*). In the effective video period, a pulse of the second horizontal synchronizing signal XHSYNC enables the horizontal counter unit 336, and makes the vertical counter unit 334 to start the counting-up operation. The internal structure of the vertical counter unit 334 will be described below in order to show the function thereof.

Figure 19:
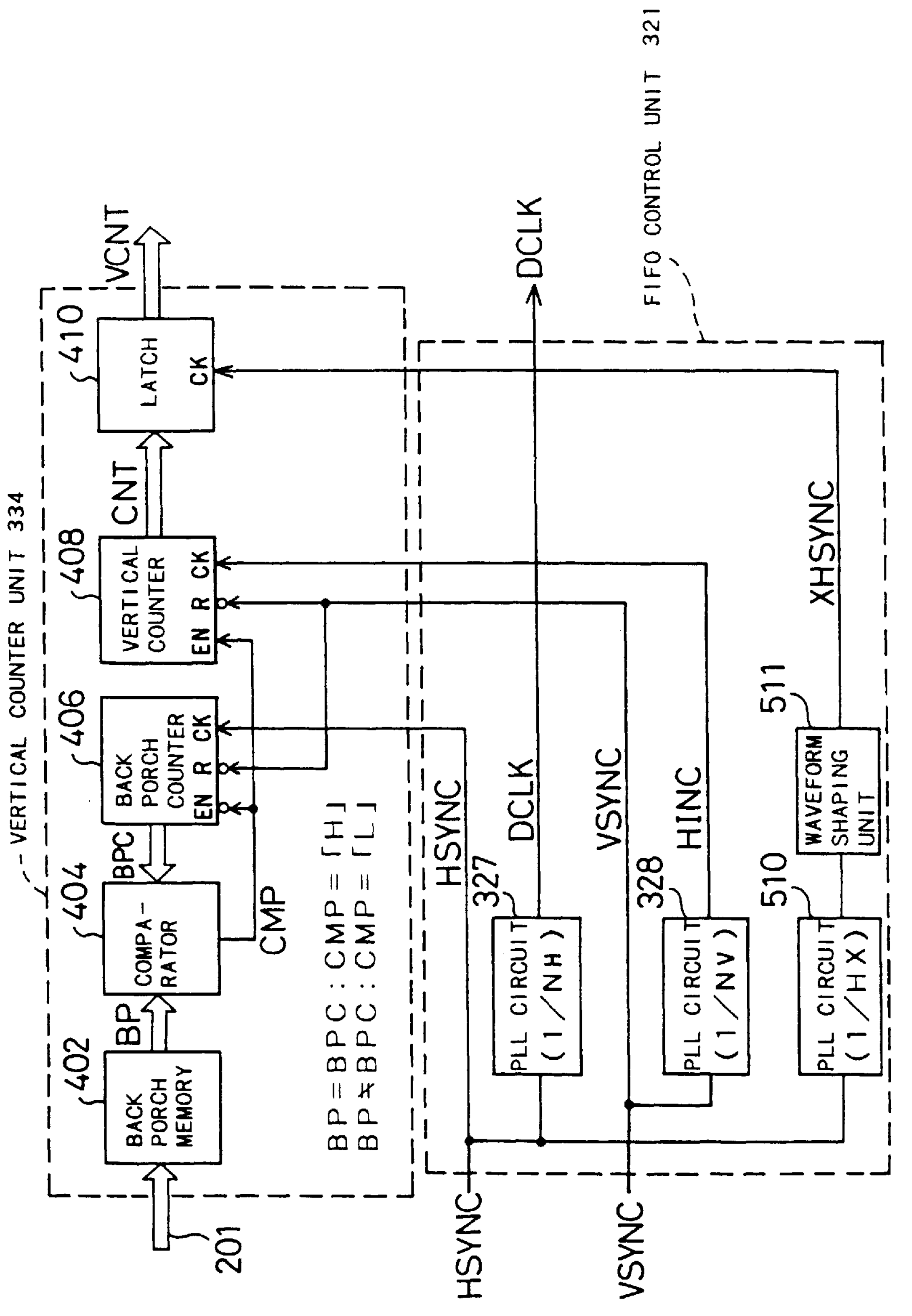
FIG. 19 is a block diagram showing the internal structure of a vertical counter unit 334 and a FIFO control unit 321.

FIG. 19 is a block diagram showing the internal structure of the vertical counter unit 26 and pertinent parts of the FIFO control unit 321. The PLL circuit 327 in the FIFO control unit 321 generates a dot clock signal DCLK whose frequency is NH times that of the horizontal synchronizing signal HSYNC. The PLL circuit 328 generate a line increment signal HINC whose frequency is Nv times that of the vertical synchronizing signal VSYNC. The case where the line increment signal HINC has the same frequency as the second horizontal synchronizing signal XHSYNC will be explained first below. In this case, the video image is not reduced in the vertical direction.

The vertical counter unit 334 includes a back porch memory 402, a comparator 404, a back porch counter 406, a vertical counter 408, and a latch 410. The back porch memory 402 stores back porch number BP given from the CPU 202 via the CPU bus. The back porch number BP denotes the number of pulses of the horizontal synchronizing signal HSYNC in the back porch period. The first horizontal synchronizing signal HSYNC is supplied to the back porch counter 406, and the second horizontal synchronizing signal XHSYNC is supplied to the clock input terminal of the latch 410. The line increment signal HINC is supplied to a clock input terminal of the vertical counter 408. The vertical synchronizing signal VSYNC is supplied to reset terminals of the back porch counter 406 and the vertical counter 408, respectively. The comparator 404 compares the back porch number BP stored in the back porch memory 402 with the count BPC in the back porch counter 406.

An output CMP of the comparator 404 becomes at the H level when BP is equal to BPC, and at the L level when BP is not equal to BPC. The back porch counter 406 is enabled when the output CMP of the comparator 404 is at the L level, whereas the vertical counter 408 is enabled when the output CMP is at the H level.

The back porch counter 406 and the vertical counter 408 are reset to zero in response to a pulse of the vertical synchronizing signal VSYNC. Since the output CMP of the comparator 404 is at the L level at that moment, the back porch counter 406 is enabled to count the number of pulses of the horizontal synchronizing signal HSYNC, while the vertical counter 408 is not operating. When the back porch counter 406 counts the number of pulses of the horizontal synchronizing signal HSYNC up to the back porch number BP, BPC becomes equal to BP. As a result, the output CMP of the comparator 404 goes up to the H level, whereby the back porch counter 406 stops the counting and the vertical counter 408 starts counting up. The count CNT of the vertical counter 408 is held by the latch 410 at a rise edge of the second horizontal synchronizing signal XHSYNC, to be output as the vertical count VCNT. The vertical count VCNT indicates the ordinal number of scanning line in the display screen. Vertical image reduction is not executed if the second horizontal synchronizing signal XHSYNC has the same frequency as the line increment signal HINC, and in this case the vertical count VCNT is equal to the number of pulses of the second horizontal synchronizing signal XHSYNC.

The vertical counter 408 and the latch 410 as a whole work as a means for generating a scanning line number.

The control signal generator 360 in the DMA control unit 316 (FIG. 13) receives a dot clock signal DCLK which is generated by the PLL circuit 327 in the FIFO control unit 321 (FIG. 19). The control signal generator 360 controls the horizontal counter unit 336 in synchronism with the dot clock signal DCLK.

When the video data VD for one pixel (=one word=24 bits) is transferred in the term TT1 of FIG. 18(*g*), the control signal generator 360 outputs a word synchronizing signal WSYNC to the horizontal counter unit 336. Actually, the control signal generator 360 outputs one pulse of the word synchronizing signal WSYNC every time when receiving one pulse of the dot clock signal DCLK. The horizontal counter unit 336 counts up the horizontal count HCNT by one in response to the word synchronizing signal WSYNC. Since VCNT=0h and HCNT=0h in the equation (5) in the term TT1, the address AD2 becomes equal to 0051h. This address AD2 corresponds to the left upper position of the moving picture area MPA shown in FIG. 15.

In the next term TT2, the address AD2 becomes equal to 0052h because VCNT=0h and HCNT=1h. This address AD2 corresponds to the right upper position of the moving picture area MPA shown in FIG. 15.

Thus the video data transfer is completed for a first scanning line L1 in the moving picture area MPA shown in FIG. 15 in the terms TT1 and TT2. At the end of the term TT2, a pulse of the second horizontal synchronizing signal XHSYNC, indicating completion of the first scanning line and start of a second scanning line, is given to the DMA control unit 316. AS described before, the frequency of the second horizontal synchronizing signal XHSYNC is HX times that of the first horizontal synchronizing signal HSYNC, where HX is an integer.

The vertical counter unit 334 increases the vertical count VCNT by one to make VCNT=1h in response to a pulse of the second horizontal synchronizing signal XHSYNC indicating the start of a next term TT3, whereas the horizontal count HCNT in the horizontal counter unit 336 is reset to zero. The video data MDATA are subsequently transferred to the VRAM 212 at the addresses 00A1h and 00A2h in the similar manner.

When the data transfer is completed for all the scanning lines L1 and L2 in the moving picture area MPA (FIG. 16), the vertical counter unit 334 and the horizontal counter unit 336 are reset to zero in response to a pulse of the vertical synchronizing signal VSYNC. As a result, the DMA controller 220 is initialized to the stand-by state until receiving video data of the next field.

As described above, both the vertical count VCNT and the horizontal count HCNT are reset to zero every time when a pulse of the vertical synchronizing signal VSYNC is supplied in the case where a video image is not reduced in the vertical direction. The vertical count VCNT is increased by one while the horizontal count HCNT is reset to zero every time when a pulse of the second horizontal synchronizing signal XHSYNC is supplied. If a video image is to be reduced in the vertical direction, the vertical count VCNT is increased in response to the second horizontal synchronizing signal XHSYNC and the line increment signal HINC. The latter case will be described later in detail.

As describe above, the vertical count VCNT is increased in response to the second horizontal synchronizing signal XHSYNC and the line increment signal HINC, and the horizontal count HCNT is increased in response to the word synchronizing signal WSYNC. Since the address of the VRAM 212 is given by the equation (5), the address is successively updated in synchronism with the second horizontal synchronizing signal XHSYNC, the line increment signal HINC, and the word synchronizing signal WSYNC. Since this address operation can be executed at a high speed, the video data MDATA representing a video image within the moving picture area MPA will be transferred to the VRAM 212 according to the address approximately every 1/60 second.

H. Address Operation in Interlace Scanning

Figures 20A, 20B:
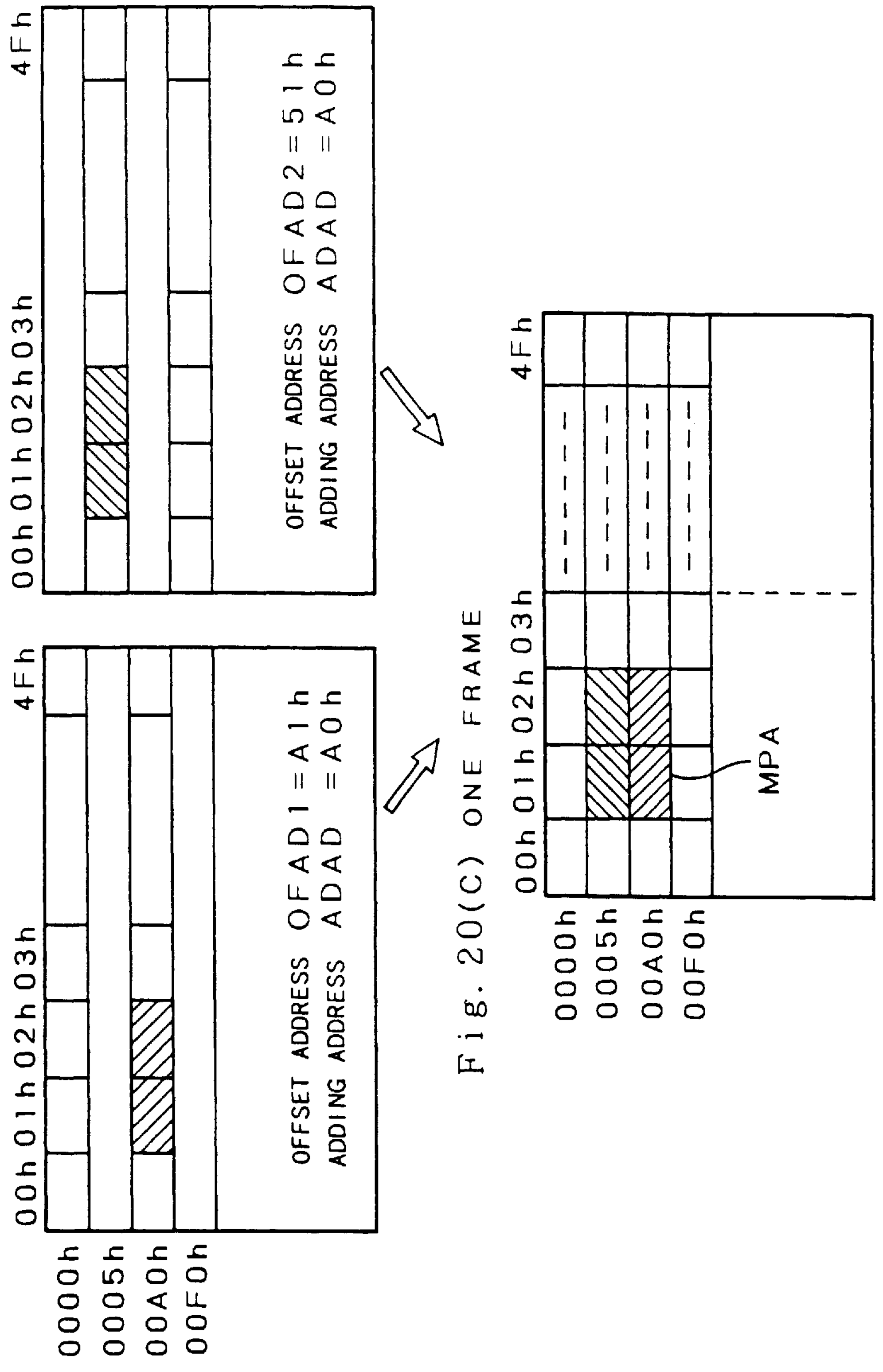

FIGS. 20(A) and 20(B) show memory spaces of an odd line field and an even line filed in interlace scanning, corresponding to FIG. 15. The odd line field includes only two addresses 00A1h and 00A2h out of four addresses in the moving picture area MPA while the even line field has the other two addresses 0051h and 0052h.

In interlace scanning, an offset address OFAD1=A1h for the odd line field and an offset address OFAD2=51h for the even line field are registered in the offset address memory unit 330 (FIG. 13). The offset address memory unit 330 selectively outputs one of the two offset addresses OFAD1 and OFAD2 according to the field indication signal FIS. In two-to-one interlacing, the adding address ADAD is twice (=A0h) the value (=50h) for the non-interlace scanning. The offset address OFAD and the adding address ADAD are thus adjusted in interlace scanning, and the address of video data is given by the equation (5) in the same manner as the non-interlace scanning described above.

In transferring video data produced for the interlace scanning, video data for the odd line field and those for the even line field may be written in the same address without performing the interlacing on purpose. In such a case, the offset address OFAD and the adding address ADAD for non-interlacing can be used for both the fields.

Since the address operation unit 312 of the DMA controller 220 consists of one multiplier and a plurality of adders, it can obtain addresses at a high speed. Since the computer system does not require video memories other than VRAM 212 for DMA transfer, it has a relatively simple circuit structure and is manufactured at a relatively low cost.

I. Image Expansion and Image Reduction

Figure 21A:
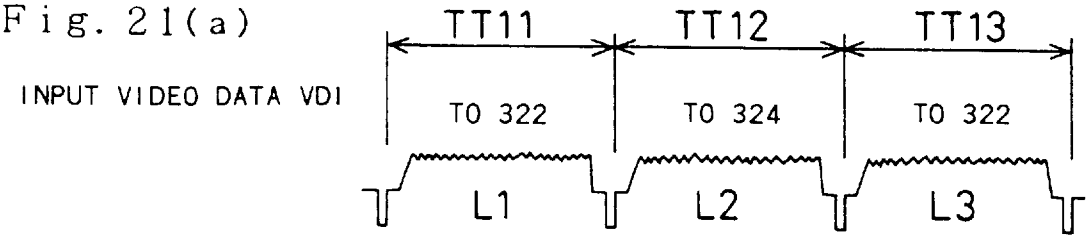
FIGS. 21(*a*) through 21(*c*) schematically illustrate image expansion operation in the vertical direction.
Figure 21B:
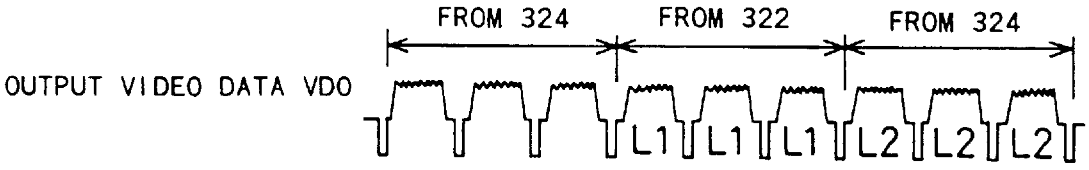
Figure 21C:
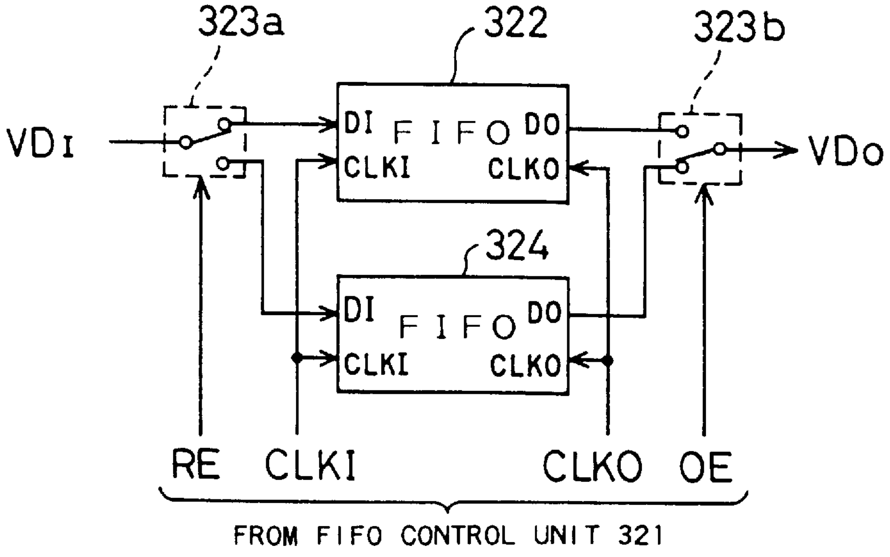

In the computer system of the embodiment, the FIFO memory unit 318 (FIG. 12(A)) has a function of expanding and reducing video images. FIGS. 21(*a*) through 21(*c*) show an expansion process in a vertical direction: FIGS. 21(*a*) and 21(*b*) show waveforms of input video data VDI and output video data VDO; and FIG. 21(*c*) schematically illustrates the function of the two FIFO memories. The video data are shown in the form of original analog video signals VS for the convenience of illustration.

As shown in FIG. 21(*c*), input terminals and output terminals of the two FIFO memories 322 and 324 are alternately switched in a complementary manner by virtual toggle switches 323*a* and 323*b*. These virtual toggle switches 323*a* and 323*b* perform functions equivalent to complementary, alternate switching of inputs and outputs of the two FIFO memories 322 and 324 by means of an input enable signal RE and an output enable signal OE given from the FIFO control unit 321. An input clock signal CLKI and an output clock signal CLKO are commonly given to the two FIFO memories 322 and 324. A frequency fCLKI of the input clock signal CLKI is NHO times that of the horizontal synchronizing signal HSYNC as can be seen from the circuit shown in FIG. 12(B). When a video signal VS given to the video input terminal 226 (FIG. 1) is an NTSC signal, fCLKI is a constant frequency of about 6 MHz. A frequency fCLKO of the output clock signal CLKO is HX times fCLKI, where HX is an integer (FIG. 12(B)). A set value (NHO*HX) in the PLL circuit 326 for generating the output clock signal CLKO is equal to HX times a set value NHO in the PLL circuit 325 for generating the input clock signal CLKI. In this embodiment, HX is equal to three.

During a first period TT11 and a third period TT13 in FIGS. 21(*a*) and 21(*b*), the input video data VDI are written into the first FIFO memory 322 while the output video data VDO are read out of the second FIFO memory 324. During a second time period TT12, on the other hand, the input video data VDI are written into the second FIFO memory 324 while the output video data VDO are read out of the first FIFO memory 322. As a result, video data for a first scanning line L1 are written into the first FIFO memory 322 during the first period TT11, and video data for a second scanning line L2 are written into the second FIFO memory 324 during the second period TT12. Since the frequency fCLKO of the output clock signal CLKO is set equal to three times the frequency fCLKI of the input clock signal CLKI in this embodiment, the video data for the first scanning line L1 are read out three times from the first FIFO memory 322 during the second time period TT12 as shown in FIG. 21(*b*).

Figures 22A, 22B, 22C:
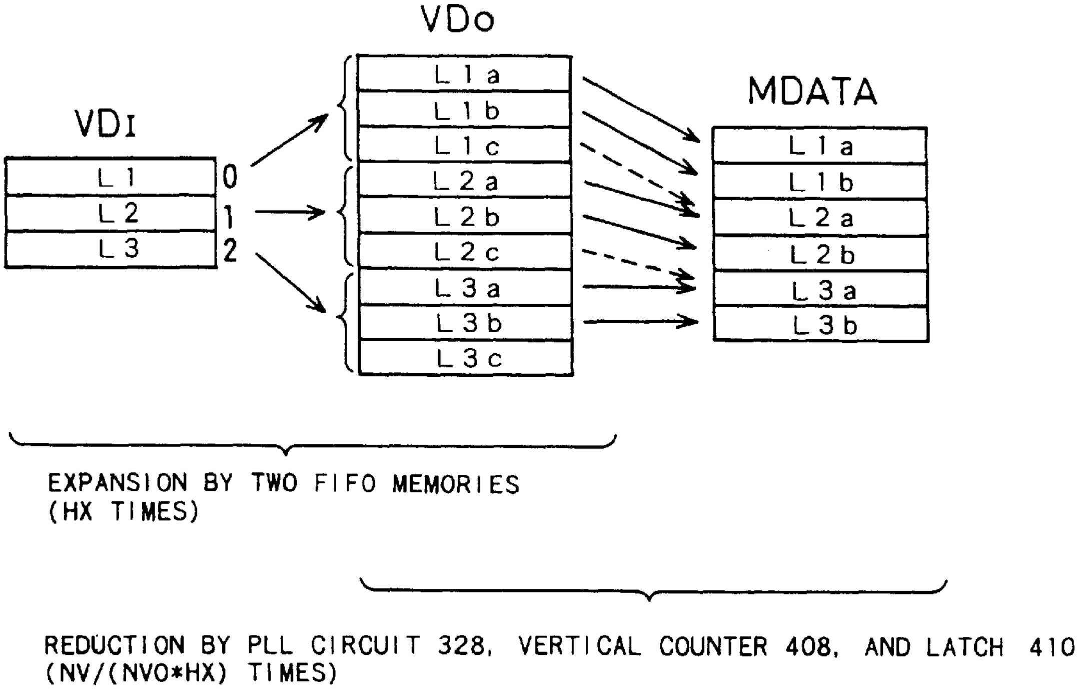
FIGS. 22(A) through 22(C) show a process of image expansion and reduction in the vertical direction.

FIGS. 22(A) through 22(C) show a process of image expansion and image reduction in the vertical direction: FIGS. 22(A) and 22(B) respectively show the input video data VDI and the output video data VDO. Each scanning line in the input video data VDI is repeated HX(=3) times in the output video data VDO. This results in expansion of a video image by HX(=3) times in the vertical direction. In FIG. 22(B), for example, symbols 'L1a', 'L1b', and 'L1c' denote the repeated lines of the original first scanning line L1. A video image will be expanded by an integral multiple in the vertical direction in this manner by setting the frequency fCLKO of the output clock signal CLKO equal to the integral multiple of the frequency fCLKI of the input clock signal CLKI. Image reduction in the vertical direction is attained by the PLL circuit 328 in the FIFO control unit 321 and the vertical counter 408 and the latch 410 in the vertical counter unit 334 shown in FIG. 19. FIGS. 23(*a*) through 23(*d*) are timing charts showing the image reduction operation in the vertical direction. The line increment signal HINC (FIG. 23(*a*)) generated in the PLL circuit 328 has a frequency fHINC, which is Nv times a frequency fVSYNC of the vertical synchronizing signal VSYNC. The second horizontal synchronizing signal XHSYNC (FIG. 23(*c*)) has a frequency fXHSYNC, which is (NVO*HX) times the frequency fVSYNC. Here NVO represents a constant value showing the number of scanning lines in one field in the original analog video signal VS (hereinafter referred to as total picture line number). For example, NVO is equal to 262.5 when the video signal VS is an NTSC signal. As shown in FIGS. 24(A) and 24(B), a set value Nv in the PLL circuit 328 is given by:

$$Nv=NVM*HX*NVO/(HX*NVL)=NVM*NVO/NVL$$

where NVO denotes the total picture line number of a video image represented by the analog video signal VS, NVL denotes the effective number of scanning lines of the video image, and NVM denotes the number of scanning lines of the video image displayed on a display device. NVM is no more than HX*NVL.

For example, when NVO=262.5, NVL=240, and NVM=480 are substituted in the above equation, the set value Nv becomes equal to 525.

The vertical counter 408 (FIG. 19) increases a count CNT (FIG. 23(*b*)) at a rise edge of the line increment signal HINC whereas the latch 410 latches the count CNT of the vertical counter 408 at a rise edge of the second horizontal synchronizing signal XHSYNC and outputs it as the vertical count VCNT (FIG. 23(*d*)).

In the example of FIGS. 23(*a*) through 23(*d*), the ratio of fHINC to fXHSYNC, or Nv/NVO*HX, is set equal to ⅔. The vertical count VCNT (FIG. 23(*d*)) goes like 0, 1, 2, 2, 3, 4, 4, 5 . . . , where the same value at every second position is repeated. Since the vertical count VCNT indicates a vertical address in the VRAM 212, video data for a third scanning line L1c and video data for a fourth scanning line L2a are written at the third vertical address VCNT=2 in the VRAM 212. Therefore the video data for the scanning line L1c first written at the third vertical address VCNT=2 are replaced by the video data for the next scanning line L2a. Repetition of such procedures results in skipping video data for the scanning lines of the ordinal numbers which are integral multiples of three, thus implementing image reduction in the vertical direction.

FIGS. 22(B) and 22(C) show the image reduction in the vertical direction according to the process shown in FIGS. 23(*a*) through 23(*d*). The output video data VDO shown in FIG. 22(B) includes video data for nine scanning lines L1a through L3c. In the image reduction process, video data for the third scanning line L1c are replaced by those for the fourth scanning line L2a, and video data for the sixth scanning line L2c are replaced by those for the seventh scanning line L3a. This results in the reduction of a video image by Nv/(NVO*HX) times in the vertical direction. Since the video data are previously expanded by HX times by means of the two FIFO memories 322 and 324, a total vertical magnification MV is given by:

$$MV=Nv/NVO \tag{6}$$

A horizontal magnification MH representing image expansion/reduction in the horizontal direction is equal to a ratio of fDCLK/fCLKO, where fDCLK denotes a frequency of the dot clock signal DCLK (FIG. 19) which is used in writing video data into the VRAM 212, and fCLKO denotes a frequency of the output clock signal CLKO (FIG. 21(*c*)) which is used in reading out video data from the FIFO memories 322 and 324. The frequency fCLKO is HX times the frequency fCLKI as described above along with FIGS. 21(*a*) through 21(*c*), and the frequency fCLKI is a constant value according to frequency characteristics of the composite video signal VS. The horizontal magnification MH is therefore given by:

$$MH=fDCLK/fCLKO=fDCLK/(HX*fCLKI) \tag{7}$$

As can be understood from FIG. 12(B), the frequency fCLKI is NHO times the frequency fHSYNC of the horizontal synchronizing signal HSYNC, where fHSYNC and NHO are constants. Further, the frequency fDCLK of the dot clock signal DCLK is NH times fHSYNC. The equation (7) is thus rewritten as:

$$\begin{aligned} M_H &= f_{DCLK}/(HX * f_{CLKI}) \quad (8)\\ &= f_{HSYNC} * N_H/(HX * f_{HSYNC} * N_{HO})\\ &= N_H/(HX * N_{HO}) \end{aligned}$$

In the equation (6) showing the vertical magnification MV and the equation (8) showing the horizontal magnification MH, the three values HX, Nv, and NH are set in the FIFO control unit 321 by the CPU 202. The three values HX, Nv, and NH are determined, for examples, as follows:

$$HX=RND(MV) \tag{9a}$$

$$Nv=NVO*MV \tag{9b}$$

$$NH=NHO*MH*HX \tag{9c}$$

where an operator RND represents raising fractions under a decimal point of a numeral in the brackets to a whole number.

Since the equations (9b) and (9c) hold for any integer HX, the value of the integer HX can be determined according to other conditions instead of the equation (9a).

FIG. 24(A) shows an original video image OR represented by an original composite video signal VS, and FIG. 24(B) shows a VRAM space where a video image MR after expansion or reduction is stored. In this embodiment, the maximum pixel number HLMAX in the horizontal direction is set equal to 780, the effective pixel number HDMAX to 640, the maximum line number 2NVO in the vertical direction to 525, and the effective line number 2NVL to 480, respectively. The video image MR in the VRAM space is directly displayed on the color CRT 300 or the color liquid crystal display 302. The vertical magnification MV and the horizontal magnification MH are thereby equal to a ratio of the size of a display window for a moving picture on a display device to the size of the original video image OR. The CPU 202 calculates the vertical magnification MV and the horizontal magnification MH from the size of the display window, and determines the three values HX, Nv, and NH according to the above equations (9a) through (9c) to set the values in the FIFO control unit 321.

In the first embodiment described above, a video image can be expanded or reduced by an arbitrary magnification during DMA transfer operation of the video data to the VRAM 212. A display position of the video image can also be set arbitrarily by the address operation unit 312. A moving picture can thereby be displayed by an arbitrary magnification at any desirable position on a display device.

J. Modification of DMA Tranfer Circuitry

The circuitry concerning the DMA transfer can be modified as follows, other than the parts dealing with the mask data TDATA.

Any RAM having two or more ports can be used as a video memory in the above embodiment. Even a single-port RAM can be used as a video memory when it realizes a function equivalent to a dual-port RAM through switching of inputs and outputs of the single port.

The present invention is applicable to data transfer of other video signals such as YUV signals as well as RGB color signals.

The present invention is also applicable to data transfer of digital video data which is obtained by decompressing compressed image data. In this case, the digital video data supplied from an image decompression unit are input into an input port for digital video data DS (shown as 'CD-ROM' in FIG. 1) between the DMA controller 220 and the A-D converter 222.

A circuit for calculating the address AD2 given by the equation (4) may have another structure other than that described in the above embodiment. For example, replacement of the adder in the DMA controller 220 with a subtracter or changing the order of additions will attain the similar effects.

In another possible structure, the multiplier 338 shown in FIG. 13 can be replaced by an adder and an up-counter, where the adding address ADAD stored in the adding address memory 332 is added by the number of times corresponding to the number of the vertical count VCNT of the vertical counter unit 334.

Figure 25:
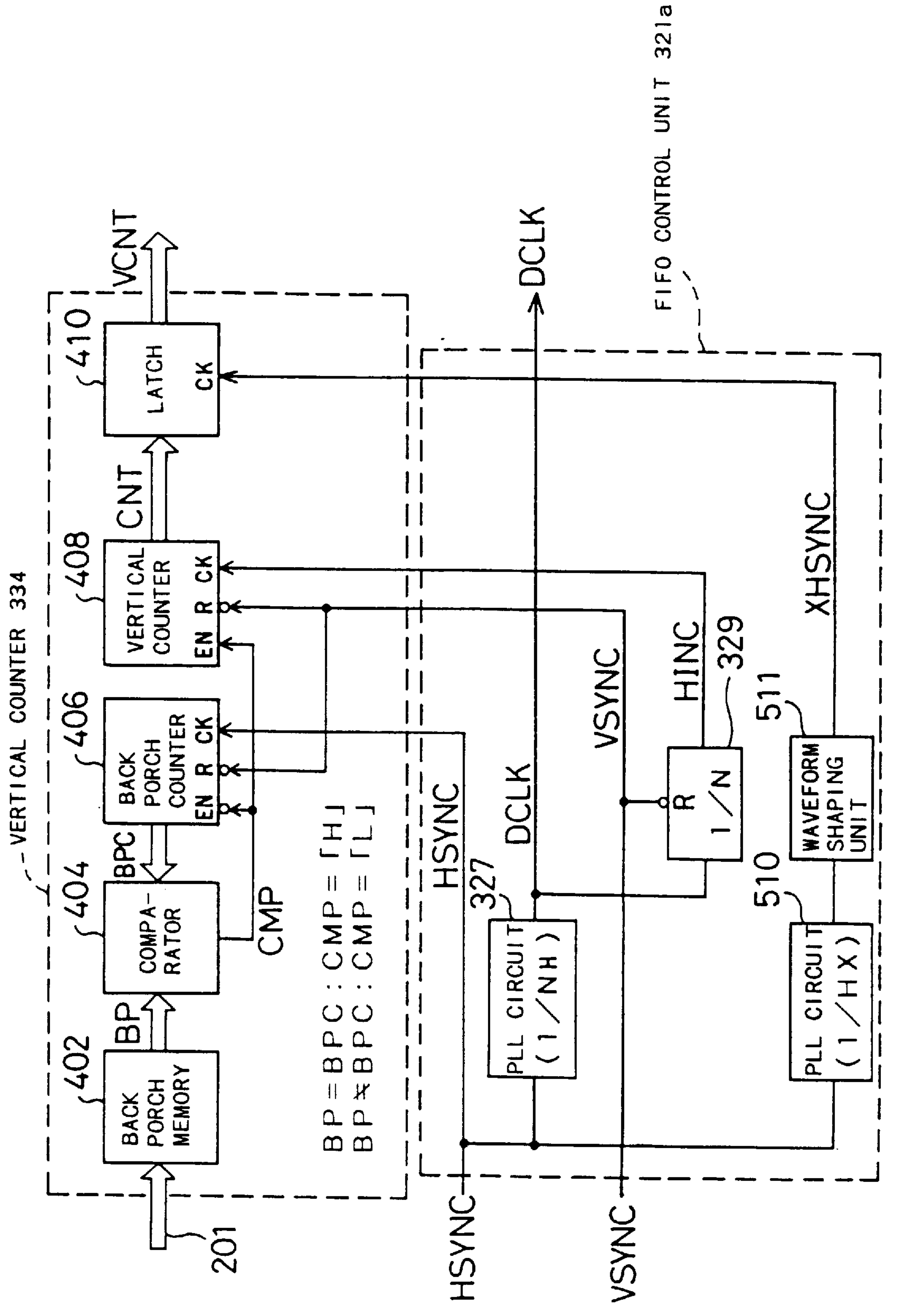
FIG. 25 is a block diagram showing a circuit structure where a second PLL circuit 328 is replaced by a divide-by-N counter.

The PLL circuit 328 of FIG. 19 can be replaced by a divide-by-N counter 329 as shown in FIG. 25. The divide-by-N counter 329 is reset by the vertical synchronizing signal VSYNC and subsequently divides the frequency of the dot clock signal DCLK by N to generate the line increment signal HINC. The device-by-N counter 329 effectively reduces jitter of the line increment signal HINC compared with that generated by the PLL circuit 328.

Figure 26A:
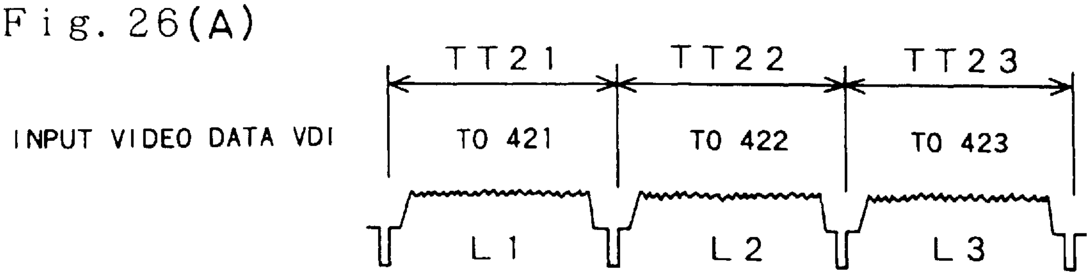
FIGS. 26(A) through 26(C) show a process of interpolation and expansion in the vertical direction with three FIFO memories.
Figure 26B:
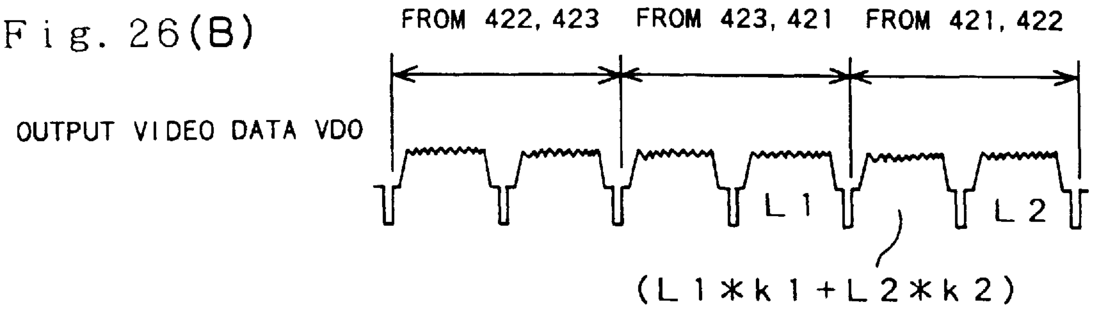
Figure 26C:
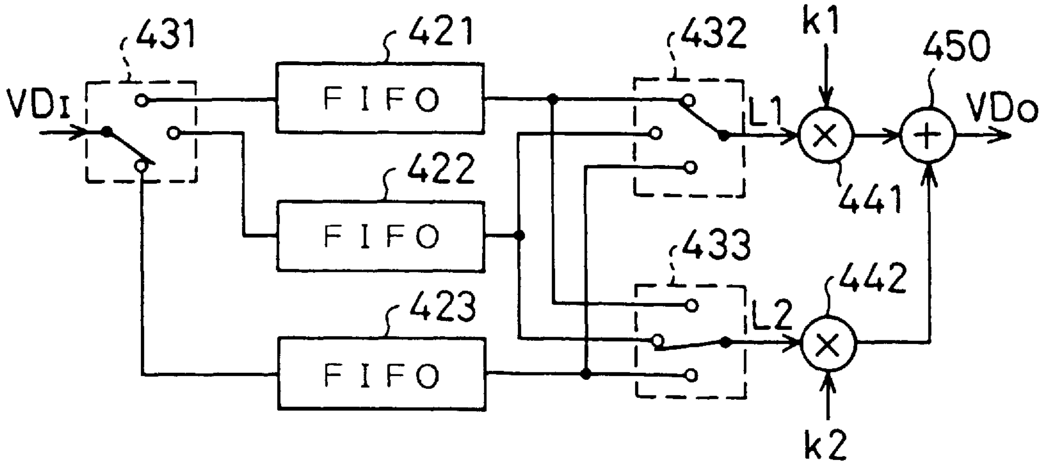

FIGS. 26(A) through 26(C), which correspond to FIGS. 21(*a*) through 21(*c*), show the structure and operation of a circuit to execute interpolation between scanning lines as well as image expansion in the vertical direction. As shown in FIG. 26(C), this circuit includes three FIFO memories 421, 422, and 423, three virtual switches 431, 432, and 433, two multipliers 441 and 442, and an adder 450. As shown in FIGS. 26(A), video data for each scanning line are written into one of the FIFO memories during each of first through third periods TT21, TT22, and TT23, while, as shown in FIG. 26(B), the stored video data are read out of the other two FIFO memories during each period. In other words, one of the FIFO memories is selected for input in a predetermined order whereas the other FIFO memories are selected for output in each period. FIG. 26(C) shows the connection states of the switches in the first half of the third period TT23. During this period, video data for a first scanning line L1 read out of the first FIFO memory 421 are multiplied by k1 by the first multiplier 441, and video data for a second scanning line L2 read out of the second FIFO memory 422 are multiplied by k2 by the second multiplier 442, and outputs of the two multipliers 441 and 442 are added by the adder 450. Output video data VDO generated by the adder 450 during the first half of the third time period TT23 is equal to (L1*k1+L2*k2) accordingly, as shown in FIG. 26(B). When both the coefficients k1 and k2 are equal to 0.5, the output video data VDO generated in the first half of the third time period TT23 is a simple average of the video data for the two scanning lines L1 and L2. The output video data VDO will become a weighted mean of the two scanning lines by setting k1 and k2 to appropriate values other than zero. In the latter half of the third time period TT23, the video data for the second scanning line L2 itself is output as the output video data VDO.

Another FIFO memory unit functioning in the same manner as the FIFO memory unit 318 can be disposed between the A-D converter 222 and the color adjustment unit 320 to attain similar effects regarding image expansion and interpolation. In such a case, the FIFO memory unit 318 of FIG. 12(A) will not expand video data VD in the vertical direction, but works as a circuit for adjusting the timing of data transfer.

In the present invention, the term "image expansion in the vertical direction" means not only simple expansion as shown in FIGS. 21(*a*) through 21(*c*) but also the expansion with interpolation as shown in FIGS. 26(A) through 26(C).

Another video data buffers, such as RAMs, can be used in place of a plurality of FIFO memories to construct a circuit having the image magnification function equivalent to the above FIFO memory unit. In general, the function of the FIFO memory unit described above can be realized by a plurality of video data buffers and a buffer control circuit, where the plurality of video data buffers are switched in a predetermined order by the buffer control circuit.

The function of the PLL circuit 325 shown in FIG. 12(B) can be realized by another circuit which receives the signal CLKO from the PLL circuit 326 to divide the frequency of the signal CLKO by an integer NHO and which is reset by the horizontal synchronizing signal HSYNC. The plurality of PLL circuits shown in FIG. 12(B) can be thus replaced by divide-by-N counters or the like.

In another modified structure, the color adjustment unit 320 shown in FIG. 3 may receive a digital video signal DS in the form of a YUV signal, and perform hue conversion to generate component video data VD in the form of RGB signals.

According to another modified structure, the color adjustor 320 shown in FIG. 3 may receive digital video signals DS as YUV signals and perform hue conversion to generate component video data VD as RGB signals.

Part of the circuit structure of the DMA controller 220 shown in FIG. 3 (for example, the DMA address operation unit 312 and the DMA control unit 316) may be included in the video accelerator 210.

K. Second Embodiment

Figure 27:
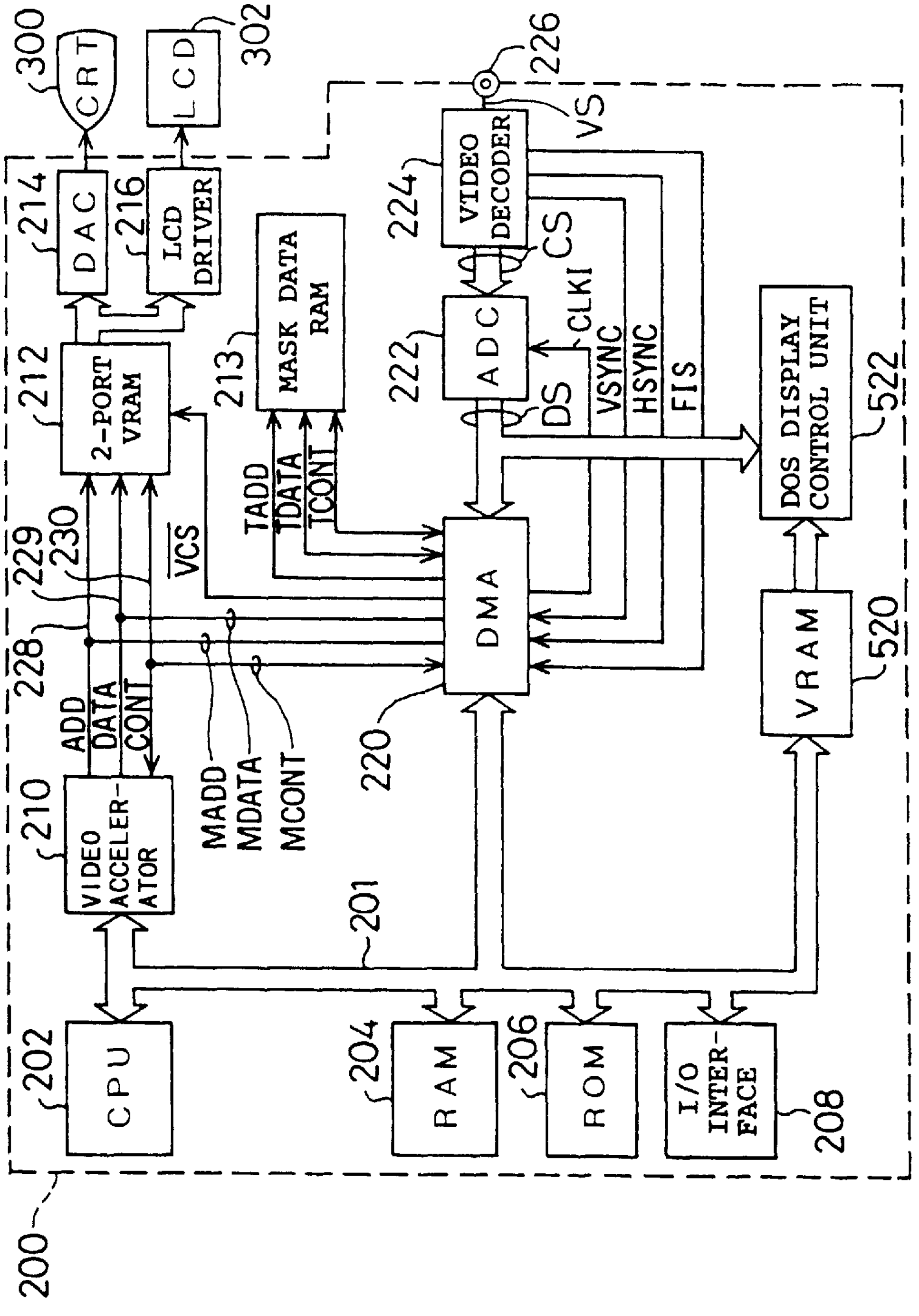
FIG. 27 is a block diagram showing a structure of another computer system as a second embodiment according to the invention.

FIG. 27 is a block diagram showing the structure of a computer system as a second embodiment of the present invention. The computer system comprises a VRAM 520 as a second video memory and a DOS display control unit 522 as a video data conversion means, as well as the elements shown in FIG. 1.

This computer system operates under two Operating Systems (hereinafter referred to as "OS"). The dual port VRAM 212 as a first video memory is managed by a first OS such as MS-Windows (trademark of Microsoft Corp.), and the VRAM 520 as a second video memory is managed by a second OS such as MS-DOS (trademark of Microsoft Corp.).

The video data in the VRAM 520 has a different data format from that in the dual port VRAM 212. The video data stored in the dual port VRAM 212 are bit map data which represent red, green and blue at each dot on the display device (the color CRT 300 and the color LCD 302), where each color is expressed by eight bits. The VRAM 520 comprises a text VRAM and a graphic VRAM. The text VRAM stores character codes representing character images, and attribute data representing attributes of each character such as color, inversion, and blinking. A color of each character is, for example, specified by 3 bits of the attribute data representing eight colors. The graphic VRAM stores bit map data representing a graphic image with respect to each dot. The graphic bit map data may be 3 bit data indicating eight colors, or four bit data indicating sixteen colors.

The DOS display control unit 522 works as a video data conversion means for converting the data format of the video data stored in the VRAM 520 to that in the dual port VRAM 212. In order to attain this function, the DOS display control unit 522 comprises a character generator for converting the character codes to bit map data, an attribute generator for giving attributes to each character, and a color palette for converting color of graphic data, and a video multiplexer for combining character images and graphics. The video data converted by the DOS display control unit 522 is transferred to the dual port VRAM 212 by the DMA controller 220.

Figure 28A:
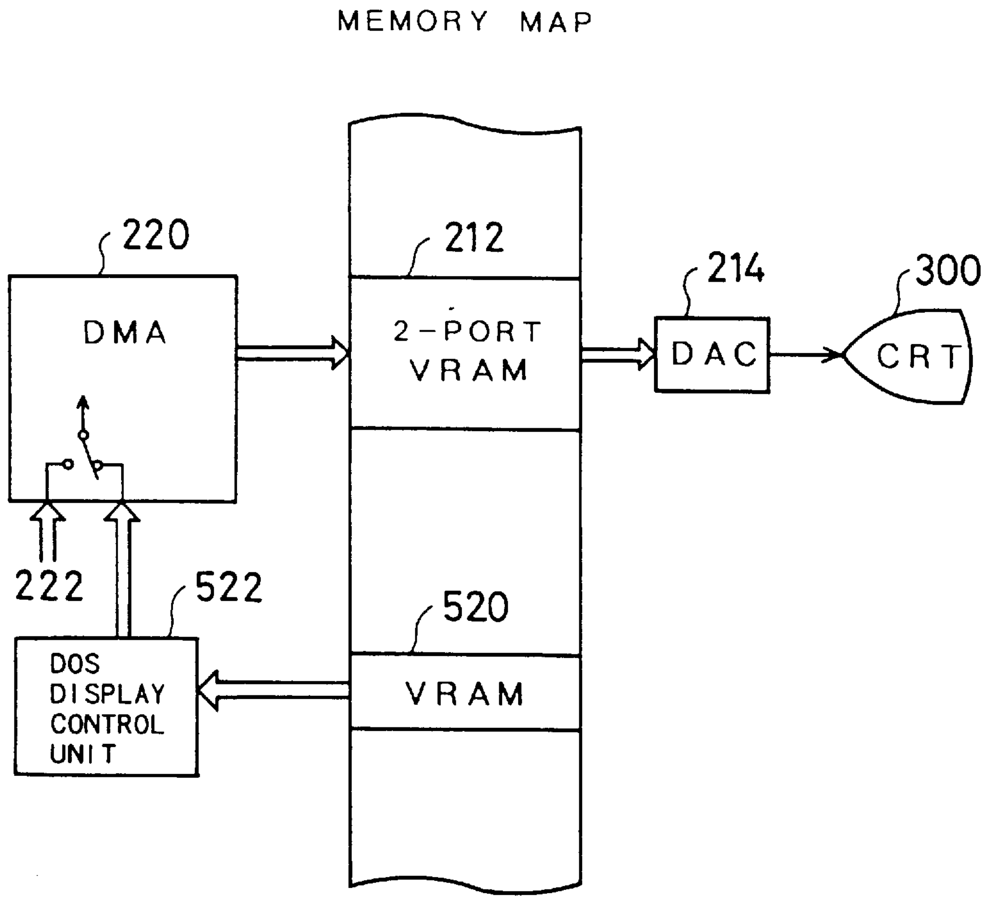
FIGS. 28(A) and 28(B) schematically illustrate data transfer between two VRAMs through a DOS display control unit 522.
Figure 28B:
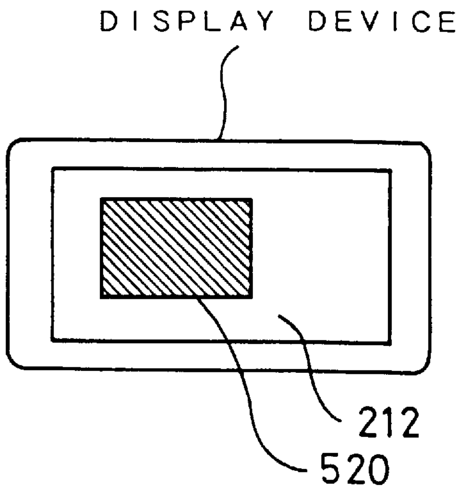
Figure 29:
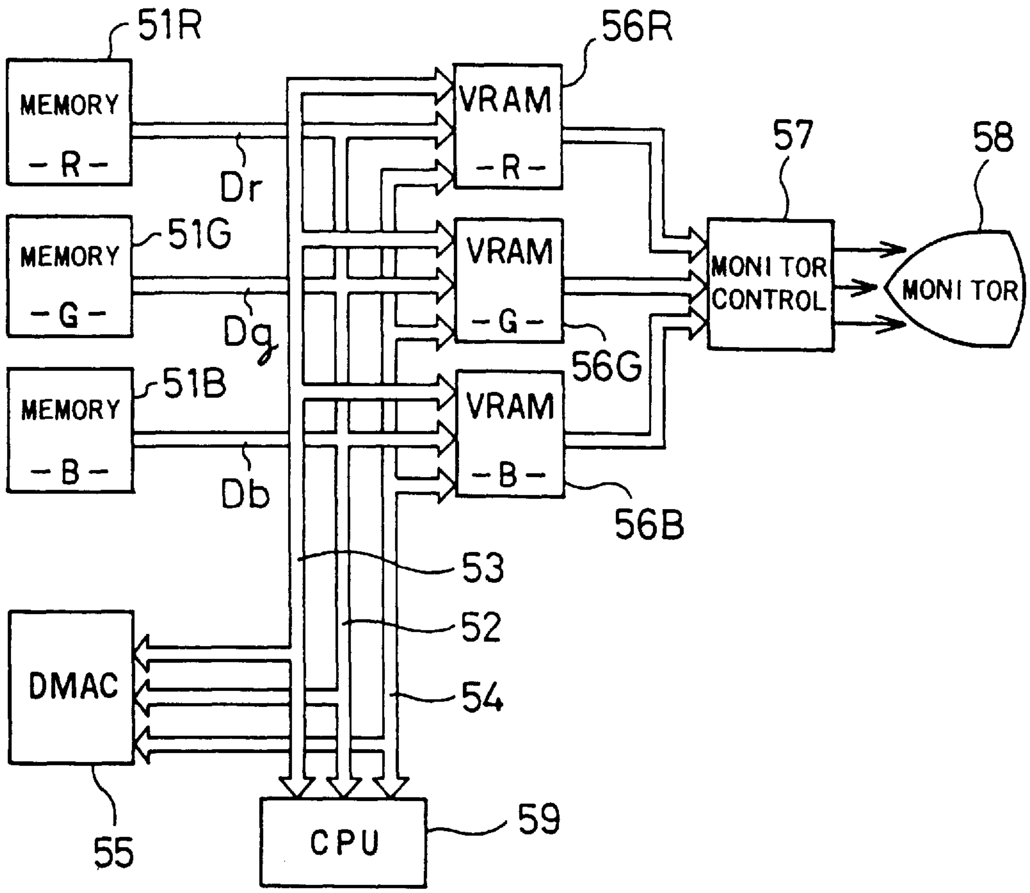
Fig. 29 (PRIOR ART)
FIG. 29 is a block diagram showing a computer system with a conventional DMA controller.
Figure 30A:
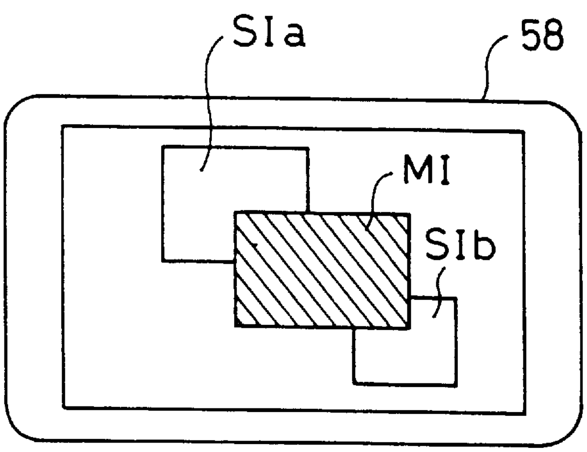
(PRIOR ART) Fig. 30(A)
FIGS. 30(A) and 30(B) show still picture images SIa and SIb and a moving picture image MI displayed in the conventional system.
Figure 30B:
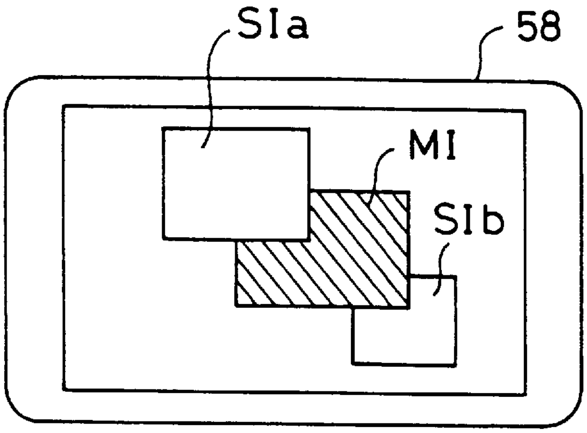

FIGS. 28(A) and 28(B) schematically illustrate the data transfer path from the VRAM 520 to the dual port VRAM 212. AS shown in FIG. 28(A), the video data stored in the VRAM 520 is converted with respect to the data format by the DOS display control unit 522, and supplied to the DMA controller 220. The DMA controller 220 transfers the video data supplied from the DOS display control unit 522 to the dual port VRAM 212 according to the procedure described in the first embodiment. The video data stored in the dual port VRAM 212 is supplied to the display device to display a moving picture image. As shown in FIG. 28(B), a display area corresponding to the VRAM 520 is preferably smaller than that of the dual port VRAM 212. In this case, the video image stored in the VRAM 520 is displayed on a part of the screen of the display device. The display area for the VRAM 520 as shown in FIG. 28(B), which is managed by MS-DOS, is called "DOS-BOX" in the MS-Windows system.

The computer system of the second embodiment can transfer the video data from the VRAM 520 to the dual port VRAM 212 with the DMA controller 220 at a high speed while converting the data format. Since the data format conversion is executed by hardware circuits in the DOS display control unit 522, it is executed at much higher speed than the conversion by the CPU 202. Further, the video image represented by the video data stored in the VRAM 520 can be expanded and reduced in the DMA transfer operation in the same manner as described before.

Although the two VRAMs 212 and 520 are managed by different OSs in the fourth embodiment, the two VRAMs may be managed by one OS. The present invention is generally applicable to the computer system which comprises two or more VRAMs for storing video data of different data formats.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus, for use in a computer system having a display device, for transferring video data, said apparatus comprising:

a frame memory which stores video data representing a video image to be displayed on said display device;

a video data supplying mechanism configured to supply moving-picture video data representing a moving picture;

a mask data memory which stores mask data representing a moving picture area in said frame memory into which said moving-picture video data are to be written, said mask data memory having the same address space as said frame memory and said frame memory being one-to-one mapped to said mask data memory; and a data transfer mechanism configured to supply a common address to said frame memory and said mask data memory, thereby reading out said mask data from said mask data memory and writing said moving-picture video data supplied from said video data supplying means into said moving picture area of said frame memory as a function of said mask data.

2. An apparatus in accordance with claim 1, wherein said data transfer mechanism comprises:

an adjusting mechanism configured to adjust a write signal for permitting a writing operation of said frame memory as a function of said mask data.

3. An apparatus in accordance with claim 2, wherein said mask data includes one bit data assigned to each pixel of an image to be displayed on said display device; and said adjusting mechanism further comprises:

a mechanism configured to adjust said write signal with respect to said each pixel by logical operation between said mask data and said write signal.

4. An apparatus in accordance with claim 1, further comprising:

a mask data updating mechanism configured to update said mask data, responsive to a change of a moving-picture display area of said moving picture on said display device, to make said moving picture area coincide with said moving-picture display area.

5. An apparatus in accordance with claim 1, wherein said data transfer mechanism comprises:

an address generation mechanism configured to generate said common address; and said address generation mechanism comprises:

a first memory which stores an offset address indicating a start position of said moving picture area in said frame memory;

a second memory which stores an adding address indicating a number of bytes corresponding to a predetermined number of scanning lines in said frame memory, said predetermined number being at least one;

first operation mechanism configured to calculate a vertical address as a function of vertical and horizontal synchronizing signals synchronous with said moving-picture video data, said vertical address being equal to a value of said adding address multiplied by a scanning line number indicating an ordinal number of a scanning line in said moving picture, said scanning line number being specified by a number of pulses of said horizontal synchronizing signal given to said first operation mechanism;

a horizontal counter which generates a horizontal address indicating a difference of an address between an initial position of each scanning line in said moving picture and each pixel on said each scanning line;

a second operation mechanism configured to add said vertical address, said horizontal address, and said offset address to obtain a transfer address indicating an address in said first video memory corresponding to a position of said each pixel on said each scanning line in said video image, and to output said transfer address onto said local bus; and a data output mechanism configured to output onto said local bus said video data to be transferred to said first video memory according to said transfer address.

6. An apparatus in accordance with claim 1, wherein said data transfer mechanism further comprises:

a plurality of video data buffers, each video data buffer storing a predetermined amount of said moving-picture video data; and a buffer control mechanism configured to select at least one video data buffer for writing in said moving-picture video data and at least another video data buffer which reads out said moving-picture video data, among said plurality of video data buffers in a predetermined order and activates said selected video data buffers.

7. An apparatus in accordance with claim 6, wherein said buffer control mechanism comprises:

a line increment signal generation mechanism configured to generate a line increment signal whose frequency is Nv times a frequency of said vertical synchronizing signal, based on at least one of said vertical synchronizing signal and said horizontal synchronizing signal; and said first operation mechanism comprises a mechanism configured to add a number of pulses of said line increment signal generated during latest two pulses of said horizontal synchronizing signal to said scanning line number, in response to each pulse of said horizontal synchronizing signal; and whereby said moving picture represented by said moving picture video data transferred to said frame memory can be reduced in a vertical direction by adjusting a value of Nv used in said line increment signal generation mechanism.

8. An apparatus in accordance with claim 6, wherein said buffer control mechanism comprises:

an input clock generation mechanism configured to generate an input clock signal whose frequency is NHO times a frequency of said horizontal synchronizing signal, and supplying said input clock signal as a write-in synchronizing signal to said one video data buffer selected for writing in said moving-picture video data; and an output clock generation mechanism configured to generate an output clock signal whose frequency is HX times the frequency of said input clock signal, where HX is an integer, and to supply said output clock signal as a read-out synchronizing signal to said another video data buffer selected for reading out said moving-picture video data; and whereby said moving picture represented by said moving picture video data read out of said plurality of video data buffers being expanded in the vertical direction by adjusting a value of HX used in said output clock generation mechanism.

9. An apparatus in accordance with claim 6, wherein said buffer control mechanism comprises:

a dot clock generation mechanism configured to generate a dot clock signal whose frequency is NH times a frequency of said horizontal synchronizing signal, said dot clock signal being used as a synchronizing signal in writing into said frame memory said moving-picture video data which is read out of said plurality of video data buffers; and whereby said moving picture represented by said moving picture video data transferred to said frame memory can be reduced and expanded in a horizontal direction by adjusting a value of NH used in said dot clock generation mechanism.

10. An apparatus for transferring moving-picture video data representing a moving picture, for use in a computer system including a display device, a frame memory which stores video data representing a video image to be displayed on said display device, and a mask data memory which stores mask data representing a moving picture area in said frame memory into which said moving-picture video data are to be written, said mask data memory having the same address space as said frame memory, said apparatus comprising:

a video data supplying mechanism configured to supply said moving picture video data; and data transfer mechanism configured to supply a common address to said frame memory and said mask data memory, thereby reading out said mask data from said mask data memory and writing said moving-picture video data supplied from said video data supplying mechanism into said moving picture area of said frame memory as a function of said mask data.

11. A computer system comprising:

a display device which displays an image;

a frame memory which stores video data representing said image to be displayed on said display device;

a video data supplying mechanism configured to supply moving-picture video data representing a moving picture;

a mask data memory which stores mask data representing a moving picture area in said frame memory into which said moving-picture video data are to be written, said mask data memory having the same address space as said frame memory and said frame memory being one-to-one mapped to said mask data memory; and a data transfer mechanism configured to supply a common address to said frame memory and said mask data memory, thereby reading out said mask data from said mask data memory and writing said moving-picture video data supplied from said video data supplying mechanism into said moving picture area of said frame memory as a function of said mask data.

12. A method of transferring moving -picture video data representing a moving picture to a frame memory, comprising the steps of:

providing said moving-picture video data;

providing mask data representing a moving picture are in said frame memory into which said moving-picture video data are to be written;

storing said mask data into a mask memory having the same address space as said frame memory and at common addresses as addresses of respective moving-picture video data stored in said frame memory so that said frame memory is one-to-one mapped to said mask data memory; and writing said moving-picture video data into said moving picture area of said frame memory at addresses of said frame memory as a function of said mask data.

* * * * *

UNITED STATES PATENT AND TRADEMARK OFFICE

CERTIFICATE OF CORRECTION

PATENT NO. : 5,880,741

DATED : MARCH 9, 1999

INVENTOR(S): Takeuchi

It is certified that an error appears in the above-identified patent and that said Letters Patent is hereby corrected as shown below:

In Claim 1, Column 23, line 31, change "means into said" to --mechanism into said--.

In Claim 10, Column 25, line 31, after "frame memory" please insert --so that said frame memory is one to one mapped to said mask data memory--;

line 41, after "mask data" please insert --with said frame memory being one to one mapped to said mask data memory--.

Signed and Sealed this

Twenty-second Day of August, 2000

*Attest:*

Q. TODD DICKINSON

*Attesting Officer* *Director of Patents and Trademarks*